US012782326B2

(12) United States Patent
Shierly et al.

(10) Patent No.: US 12,782,326 B2
(45) Date of Patent: Nov. 3, 2026

(54) METHODS AND SYSTEMS FOR ASSESSING CHROMATOGRAPHIC COLUMN INTEGRITY

(71) Applicant: Regeneron Pharmaceuticals, Inc., Tarrytown, NY (US)

(72) Inventors: Eric Shierly, Tarrytown, NY (US); Kevin Brennan, Tarrytown, NY (US); Donald Cross, Tarrytown, NY (US)

(73) Assignee: REGENERON PHARMACEUTICALS, INC., Tarrytown, NY (US)

( * ) Notice: Subject to any disclaimer, the term of this patent is extended or adjusted under 35 U.S.C. 154(b) by 376 days.

(21) Appl. No.: 18/540,970

(22) Filed: Dec. 15, 2023

(65) Prior Publication Data

US 2024/0198253 A1 Jun. 20, 2024

Related U.S. Application Data

(60) Provisional application No. 63/387,717, filed on Dec. 16, 2022.

(51) Int. Cl.
*B01D 15/12* (2006.01)
*B01D 15/18* (2006.01)
(Continued)

(52) U.S. Cl.
CPC ............. *B01D 15/12* (2013.01); *B01D 15/18* (2013.01); *B01D 15/22* (2013.01); *G01N 30/60* (2013.01); *G01N 30/6069* (2013.01)

(58) Field of Classification Search
CPC ...... B01D 15/12; B01D 15/22; B01D 15/102; B01D 15/18; G01N 30/88; G01N 30/6069;
(Continued)

(56) References Cited

U.S. PATENT DOCUMENTS 3,250,058 A * 5/1966 Raymond .............. B01D 15/08 95/85
3,334,514 A * 8/1967 Catravas ............ G01N 30/6017 73/23.35

(Continued)

FOREIGN PATENT DOCUMENTS

GB 2506165 A1 9/2012
WO 2018/052952 A1 3/2018

OTHER PUBLICATIONS

M. Sarker et al., "Study of the operating conditions of axial compression cols. for preparative chromatography", Journal of Chromatography A, Elsevier, Amsterdam, NL, vol. 709, No. 2, Aug. 18, 1995, pp. 227-239.

(Continued)

*Primary Examiner* — Joseph W Drodge
(74) *Attorney, Agent, or Firm* — BakerHostetler

(57) ABSTRACT

A chromatographic column analog may include chromatography media. The chromatographic column analog may further include a void configured to create a zone of preferential flow within the chromatography media, a block configured to create a zone of reduced flow within the chromatography media, or a void and a block. The block may include a top face, a bottom face, and a thickness between the top face and the bottom face. A width of a top or bottom face of the block may be about 50 percent to about 90 percent of an inner diameter of the analog.

17 Claims, 15 Drawing Sheets

(51) Int. Cl.
*B01D 15/22* (2006.01)
*G01N 30/60* (2006.01)

(58) Field of Classification Search
CPC . G01N 30/60; G01N 30/6004; G01N 30/6052
See application file for complete search history.

(56) References Cited

U.S. PATENT DOCUMENTS

| | | | | |
|---|---|---|---|---|
| 3,374,606 | A * | 3/1968 | Baddour | G01N 30/38 95/85 |
| 3,436,897 | A * | 4/1969 | Crowley | G01N 30/38 95/85 |
| 5,462,659 | A * | 10/1995 | Saxena | B01D 15/18 210/656 |
| 6,927,004 | B2 | 8/2005 | Eurlings et al. | |
| 7,087,411 | B2 | 8/2006 | Daly et al. | |
| 7,279,159 | B2 | 10/2007 | Daly et al. | |
| 7,582,298 | B2 | 9/2009 | Stevens et al. | |
| 8,043,617 | B2 | 10/2011 | Stevens et al. | |
| 8,062,640 | B2 | 11/2011 | Sleeman et al. | |
| 8,735,095 | B2 | 5/2014 | Martin et al. | |
| 8,871,209 | B2 | 10/2014 | Stitt et al. | |
| 8,945,559 | B2 | 2/2015 | Dix et al. | |
| 9,018,356 | B2 | 4/2015 | Sleeman et al. | |
| 9,079,948 | B2 | 7/2015 | Orengo et al. | |
| 9,132,192 | B2 | 9/2015 | Daly et al. | |
| 9,173,880 | B2 | 11/2015 | Dix et al. | |
| 9,260,515 | B2 | 2/2016 | Stitt et al. | |
| 9,265,827 | B2 | 2/2016 | Papadopoulos et al. | |
| 9,302,015 | B2 | 4/2016 | Papadopoulos et al. | |
| 9,402,898 | B2 | 8/2016 | Walsh et al. | |
| 2014/0044730 | A1 | 2/2014 | Yancopoulos et al. | |
| 2014/0088295 | A1 | 3/2014 | Smith et al. | |
| 2014/0271642 | A1 | 9/2014 | Murphy et al. | |
| 2014/0271653 | A1 | 9/2014 | Gurnett-Bander et al. | |
| 2014/0271658 | A1 | 9/2014 | Murphy et al. | |
| 2014/0271681 | A1 | 9/2014 | Martin et al. | |
| 2015/0203579 | A1 | 7/2015 | Papadopoulos et al. | |
| 2015/0203580 | A1 | 7/2015 | Papadopoulos et al. | |
| 2015/0259423 | A1 | 9/2015 | Kirshner et al. | |
| 2015/0266966 | A1 | 9/2015 | Smith et al. | |
| 2015/0313194 | A1 | 11/2015 | Hu et al. | |
| 2015/0337045 | A1 | 11/2015 | Okamoto et al. | |
| 2016/0075778 | A1 | 3/2016 | Okamoto et al. | |

OTHER PUBLICATIONS

Karin C. E. Östergren et al., "Deformation of a chromatographic bed during steady-state liquid flow", AICHE Journal, John Wiley & Sons, Inc, US, vol. 44, No. 1, Jan. 1998, pp. 2-12, XP071000426.
International Search Report mailed Apr. 22, 2024, for International Application No. PCT/US2023/084154 (4 pages).

* cited by examiner

METHODS AND SYSTEMS FOR ASSESSING CHROMATOGRAPHIC COLUMN INTEGRITY

CROSS-REFERENCE TO RELATED APPLICATION

This application claims priority to U.S. Provisional Patent Application No. 63/387,717, filed on Dec. 16, 2022, which is hereby incorporated by reference in its entirety.

FIELD OF DISCLOSURE

The present disclosure relates to systems and methods for assessing chromatographic column integrity. Some aspects of the present disclosure relate to systems and methods for the evaluation of process risk of the biological production of therapeutics related to chromatographic column integrity.

INTRODUCTION

Biopharmaceutical products (e.g., antibodies, fusion proteins, adeno-associated viruses (AAVs), proteins, tissues, cells, polypeptides, or other therapeutic products of biological origin) are increasingly being used in the treatment and prevention of infectious diseases, genetic diseases, autoimmune diseases, and other ailments. Production of the biopharmaceutical products requires chromatography to purify, characterize, and validate the products. Disruptions in the functionality of a chromatography system, for example, diminishment of chromatographic column integrity, can affect the purity of biopharmaceutical products produced using chromatography.

Due to the narrow tolerances required for biopharmaceutical product manufacture, even partial loss of chromatographic column integrity can render all product that contacts the compromised column unusable. The exact effect of diminished chromatographic column integrity on the processed biopharmaceutical products is unknown. The efficacy of studying the extent and mechanisms of the effect of chromatographic column integrity on biological product production is limited, largely by the cost of the large amount of unusable product that would need to be generated to conduct such studies. Commercially available bench-scale chromatographic columns are incapable of replicating observed failure modes of manufacturing-scale chromatographic column integrity.

SUMMARY

Aspects of the present disclosure relate to chromatographic column analogs. A chromatographic column analog may include chromatography media. A chromatographic column analog may include a void configured to create a zone of preferential flow within the chromatography media. A chromatographic column analog may include a block configured to create a zone of reduced flow within the chromatography media.

The analog may include a tube including a top opening and a bottom opening. The void may be between the top opening and the bottom opening of the tube. The void may have a length of about 1.0 cm to about 10 cm. The void may have a width of about 0.5 cm to about 1.0 cm. The analog may include a first filter screen in contact with the top opening and a second filter screen in contact with the bottom opening. The first and second filter screens may be impermeable to the chromatography media. The tube may include a wall between the top opening and the bottom opening. The wall may be in contact with the chromatography media. The tube may comprise stainless steel, glass, or another material impermeable to water. The block may include a top face, a bottom face, and a thickness between the top face and the bottom face. The bottom face may have a width of about 0.5 cm to about 2.5 cm. The analog may have a total volume of about 15 mL to about 4600 mL.

In another aspect, the present disclosure is directed to chromatographic column analogs including chromatography media. A chromatographic column analog may include a void that does not include chromatography media, wherein the void is permeable to water and/or chromatography media. A chromatographic column analog may include a block that does not include chromatography media, wherein the block is impermeable to water.

The analog may include a lumen including a top opening and a bottom opening, wherein the void is between the top opening and the bottom opening. The lumen may be parallel to a longitudinal axis of the analog. A first portion of the chromatography media may be above the top opening and a second portion of the chromatography media may be below the bottom opening. The block may be below the top opening of the lumen and above the bottom opening of the lumen. A width of the block may be greater than or equal to a thickness of the block. The thickness of the block may be substantially parallel with a longitudinal axis of the analog. The width of the block may be about 50 percent to about 90 percent of an inner diameter of the analog. The block may be a first block, and the analog may include a second block.

In another aspect, the present disclosure is directed to a method of determining a relationship between column integrity and product quality. The method may include performing a first iteration of a chromatography operation using a chromatography column, thereby generating a first chromatogram and a first product pool. The method may further include performing a second iteration of the chromatography operation using a channeling analog, thereby generating a second chromatogram and a second product pool. The method may include performing a third iteration of a chromatography operation using a blocking analog, thereby generating a third chromatogram and a third product pool. The method may further include analyzing the product quality of the first product pool, the second product pool, and the third product pool, and determining one or more peak characteristics of the first chromatogram, the second chromatogram, and the third chromatogram. The method may also include determining a relationship between product quality and the one or more peak characteristics.

Analyzing product quality may include Pico microchip-capillary electrophoresis (PICO MCE) purity analysis, size-exclusion ultra performance liquid chromatography (SE-UPLC) purity analysis, imaged capillary isoelectric focusing (iCEIF), glycan analysis, host cell DNA analysis, and/or host cell protein analysis. The chromatography operation may include introducing a mobile phase comprising a salt slug. Determining one or more peak characteristics of the first chromatogram, the second chromatogram, and the third chromatogram, may include determining a first peak start, a first peak maximum, and a first peak end for a first peak of the first chromatogram; determining a second peak start, a second peak maximum, and a second peak end, for a second peak of the second chromatogram; and determining a third peak start, a third peak maximum, and a third peak end, for a third peak of the third chromatogram. The first peak, the second peak, and the third peak, may correspond to elution of the salt slug.

BRIEF DESCRIPTION OF THE DRAWINGS

The accompanying drawings, which are incorporated in and constitute a part of this specification, illustrate various exemplary embodiments, and together with the description, serve to explain the principles of the disclosed embodiments. Any features of an embodiment or example described herein (e.g., composition, formulation, method, etc.) may be combined with any other embodiment or example, and all such combinations are encompassed by the present disclosure. Moreover, the described systems and methods are neither limited to any single aspect nor embodiment thereof, nor to any combinations or permutations of such aspects and embodiments. For the sake of brevity, certain permutations and combinations are not discussed and/or illustrated separately herein.

DETAILED DESCRIPTION

Figure 1:
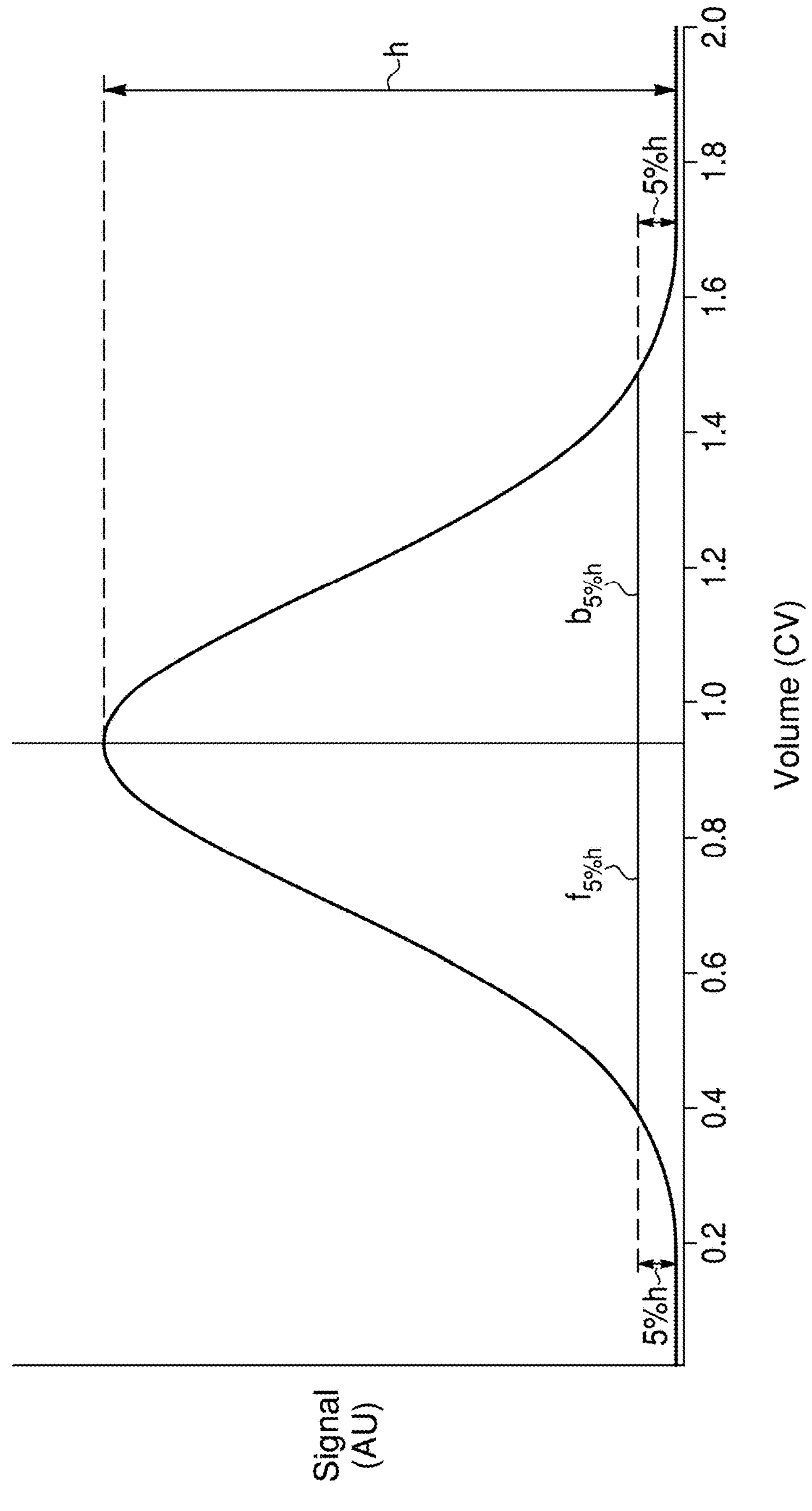
FIG. 1 is a graphical representation of an asymmetry factor calculation, according to aspects of the present disclosure.

Unless defined otherwise, all technical and scientific terms used herein have the same meaning as is commonly understood by one of ordinary skill in the art to which this disclosure belongs. Although any suitable methods and materials (e.g., similar or equivalent to those described herein) can be used in the practice or testing of the present disclosure, particular example methods are now described. All publications mentioned are hereby incorporated by reference.

As used herein, the terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." For the terms "for example" and "such as," and grammatical equivalences thereof, the phrase "and without limitation" is understood to follow unless explicitly stated otherwise.

As used herein, the term "about" is meant to account for variations due to experimental error. When applied to numeric values, the term "about" may indicate a variation of +/−5% from the disclosed numeric value, unless a different variation is specified. As used herein, the singular forms "a," "an," and "the" include plural referents unless the context clearly dictates otherwise. Further, all ranges are understood to be inclusive of endpoints, e.g., from 1 centimeter (cm) to 5 cm would include lengths of 1 cm, 5 cm, and all distances between 1 cm and 5 cm.

It should be noted that all numeric values disclosed or claimed herein (including all disclosed values, limits, and ranges) may have a variation of +/−5% from the disclosed numeric value unless a different variation is specified.

The term "polypeptide" as used herein refers to any amino acid polymer having more than about 20 amino acids covalently linked via amide bonds. Proteins contain one or more amino acid polymer chains (e.g., polypeptides). Thus, a polypeptide may be a protein, and a protein may contain multiple polypeptides to form a single functioning biomolecule.

Post-translational modifications may modify or alter the structure of a polypeptide. For example, disulfide bridges (e.g., S—S bonds between cysteine residues) may be formed post-translationally in some proteins. Some disulfide bridges are essential to proper structure, function, and interaction of polypeptides, immunoglobulins, proteins, co-factors, substrates, and the like. In addition to disulfide bond formation, proteins may be subject to other post-translational modifications, such as lipidation (e.g., myristoylation, palmitoylation, farnesoylation, geranylgeranylation, and glycosylphosphatidylinositol (GPI) anchor formation), alkylation (e.g., methylation), acylation, amidation, glycosylation (e.g., addition of glycosyl groups at arginine, asparagine, cysteine, hydroxylysine, serine, threonine, tyrosine, and/or tryptophan), and phosphorylation (i.e., the addition of a phosphate group to serine, threonine, tyrosine, and/or histidine). Post-translational modifications may affect the hydrophobicity, electrostatic surface properties, or other properties which determine the surface-to-surface interactions participated in by the polypeptide.

As used herein, the term "protein" includes biotherapeutic proteins, recombinant proteins used in research or therapy, trap proteins and other Fc-fusion proteins, chimeric proteins, antibodies, monoclonal antibodies, human antibodies, bispecific antibodies, antibody fragments, antibody-like molecules, nanobodies, recombinant antibody chimeras, cytokines, chemokines, peptide hormones, and the like. A protein of interest (POI) may include any polypeptide or protein that is desired to be isolated, purified, or otherwise prepared. POIs may include polypeptides produced by a cell, including antibodies.

The term "antibody," as used herein, includes immunoglobulins comprised of four polypeptide chains: two heavy (H) chains and two light (L) chains inter-connected by disulfide bonds. Typically, antibodies have a molecular weight of over 100 kDa, such as between 130 kDa and 200 kDa, such as about 140 kDa, 145 kDa, 150 kDa, 155 kDa, or 160 kDa. Each heavy chain comprises a heavy chain variable region (abbreviated herein as HCVR or VH) and a heavy chain constant region. The heavy chain constant region comprises three domains, CH1, CH2 and CH3. Each light chain comprises a light chain variable region (abbreviated herein as LCVR or VL) and a light chain constant region. The light chain constant region comprises one domain, CL. The VH and VL regions can be further subdivided into regions of hypervariability, termed complementarity determining regions (CDR), interspersed with regions that are more conserved, termed framework regions (FR). Each VH and VL is composed of three CDRs and four FRs, arranged from amino-terminus to carboxy-terminus in the following order: FR1, CDR1, FR2, CDR2, FR3, CDR3, FR4 (heavy chain CDRs may be abbreviated as HCDR1, HCDR2 and HCDR3; light chain CDRs may be abbreviated as LCDR1, LCDR2 and LCDR3.

A class of immunoglobulins called Immunoglobulin G (IgG), for example, is common in human serum and comprises four polypeptide chains—two light chains and two heavy chains. Each light chain is linked to one heavy chain via a cystine disulfide bond, and the two heavy chains are bound to each other via two cystine disulfide bonds. Other classes of human immunoglobulins include IgA, IgM, IgD, and IgE. In the case of IgG, four subclasses exist: IgG 1, IgG 2, IgG 3, and IgG 4. Each subclass differs in their constant regions, and as a result, may have different effector functions. In some embodiments described herein, a biopharmaceutical product may comprise a target polypeptide including IgG. In at least one embodiment, the target polypeptide comprises IgG 4.

The term "antibody," as used herein, also includes antigen-binding fragments of full antibody molecules. The terms "antigen-binding portion" of an antibody, "antigen-binding fragment" of an antibody, and the like, as used herein, include any naturally occurring, enzymatically obtainable, synthetic, or genetically engineered polypeptide or glycoprotein that specifically binds an antigen to form a complex. Antigen-binding fragments of an antibody may be derived, e.g., from full antibody molecules using any suitable standard techniques such as proteolytic digestion or recombinant genetic engineering techniques involving the manipulation and expression of DNA encoding antibody variable and optionally constant domains. Such DNA is known and/or is readily available from, e.g., commercial sources, DNA libraries (including, e.g., phage-antibody libraries), or can be synthesized. The DNA may be sequenced and manipulated chemically or by using molecular biology techniques, for example, to arrange one or more variable and/or constant domains into a suitable configuration, or to introduce codons, create cysteine residues, modify, add or delete amino acids, etc.

Biopharmaceutical products (e.g., target molecules, polypeptides, antibodies) may be produced using recombinant cell-based production systems, such as the insect baculovirus system, yeast systems (e.g., *Pichia* sp.), or mammalian systems (e.g., CHO cells and CHO derivatives like CHO-K1 cells). The term "cell" includes any cell that is suitable for expressing a recombinant nucleic acid sequence. Cells include those of prokaryotes and eukaryotes (single-cell or multiple-cell), bacterial cells (e.g., strains of *E. coli, Bacillus* spp., *Streptomyces* spp., etc.), mycobacteria cells, fungal cells, yeast cells (e.g., *S. cerevisiae, S. pombe, P. pastoris, P. methanolica*, etc.), plant cells, insect cells (e.g., SF-9, SF-21, baculovirus-infected insect cells, *Trichoplusia ni*, etc.), non-human animal cells, human cells, or cell fusions such as, for example, hybridomas or quadromas. In some embodiments a cell may be a human, monkey, ape, hamster, rat, or mouse cell. In some embodiments, a cell may be eukaryotic and may be selected from the following cells: CHO (e.g., CHO K1, DXB-11 CHO, Veggie-CHO), COS (e.g., COS-7), retinal cell, Vero, CV1, kidney (e.g., HEK293, 293 EBNA, MSR 293, MDCK, HaK, BHK), HeLa, HepG2, WI38, MRC 5, Colo205, HB 8065, HL-60, (e.g., BHK21), Jurkat, Daudi, A431 (epidermal), CV-1, U937, 3T3, L cell, C127 cell, SP2/0, NS-0, MMT 060562, Sertoli cell, BRL 3A cell, HT1080 cell, myeloma cell, tumor cell, and a cell line derived from an aforementioned cell. In some embodiments, a cell may comprise one or more viral genes, e.g. a retinal cell that expresses a viral gene (e.g., a PER.C6™ cell).

The term "target molecule" may be used herein to refer to target polypeptides (e.g., antibodies, antibody fragments, or other proteins or protein fragments), or to other molecules intended to be produced, isolated, purified, and/or included in drug products (e.g., adeno-associated viruses (AAVs) or other molecules for therapeutic use). While methods according to the present disclosure may refer to target polypeptides, they may be as applicable to other target molecules. AAVs, for example, may be prepared according to suitable methods (e.g., depth filtration, affinity chromatography, and the like), and mixtures including AAVs may be subjected to methods according to the present disclosure. Before or after following one or more methods of the present disclosure, mixtures including AAVs may be subjected to additional procedures (e.g., to the removal of "empty cassettes" or AAVs that do not contain a target sequence).

In some embodiments, the target molecule is an antibody, a human antibody, a humanized antibody, a chimeric antibody, a monoclonal antibody, a multispecific antibody, a bispecific antibody, an antigen binding antibody fragment, a single chain antibody, a diabody, triabody or tetrabody, a Fab fragment or a F(ab')2 fragment, an IgD antibody, an IgE antibody, an IgM antibody, an IgG antibody, an IgG1 antibody, an IgG2 antibody, an IgG3 antibody, or an IgG4 antibody. In one embodiment, the antibody is an IgG1 antibody. In one embodiment, the antibody is an IgG2 antibody. In one embodiment, the antibody is an IgG4 antibody. In one embodiment, the antibody is a chimeric IgG2/IgG4 antibody. In one embodiment, the antibody is a chimeric IgG2/IgG1 antibody. In one embodiment, the antibody is a chimeric IgG2/IgG1/IgG4 antibody.

In some embodiments, a target molecule (e.g., an antibody) is selected from a group consisting of an anti-Programmed Cell Death 1 antibody (e.g., an anti-PD1 antibody as described in U.S. Pat. Appln. Pub. No. US2015/0203579A1), an anti-Programmed Cell Death Ligand-1 (e.g., an anti-PD-L1 antibody as described in in U.S. Pat. Appln. Pub. No. US2015/0203580A1), an anti-Dl14 antibody, an anti-Angiopoetin-2 antibody (e.g., an anti-ANG2 antibody as described in U.S. Pat. No. 9,402,898), an anti-Angiopoetin-Like 3 antibody (e.g., an anti-AngPtl3 antibody as described in U.S. Pat. No. 9,018,356), an anti-platelet derived growth factor receptor antibody (e.g., an anti-PDGFR antibody as described in U.S. Pat. No. 9,265,827), an anti-Prolactin Receptor antibody (e.g., anti- PRLR antibody as described in U.S. Pat. No. 9,302,015), an anti-Complement 5 antibody (e.g., an anti-C5 antibody as described in U.S. Pat. Appln. Pub. No US2015/0313194A1), an anti-TNF antibody, an anti-epidermal growth factor receptor antibody (e.g., an anti-EGFR antibody as described in U.S. Pat. No. 9,132,192 or an anti-EGFRvIII antibody as described in U.S. Pat. Appln. Pub. No. US2015/0259423A1), an anti-Proprotein Convertase Subtilisin Kexin-9 antibody (e.g., an anti-PCSK9 antibody as described in U.S. Pat. No. 8,062,640 or U.S. Pat. Appln. Pub. No. US2014/0044730A1), an anti-Growth And Differentiation Factor-8 antibody (e.g., an anti-GDF8 antibody, also known as anti-myostatin antibody, as described in U.S. Pat. Nos. 8,871,209 or 9,260,515), an anti-Glucagon Receptor (e.g., anti-GCGR antibody as described in U.S. Pat. Appln. Pub. Nos. US2015/0337045A1 or US2016/0075778A1), an anti-VEGF antibody, an anti-IL1R antibody, an interleukin 4 receptor antibody (e.g., an anti-IL4R antibody as described in U.S. Pat. Appln. Pub. No. US2014/0271681A1 or U.S. Pat. Nos. 8,735,095 or 8,945,559), an anti-interleukin 6 receptor antibody (e.g., an anti-IL6R antibody as described in U.S. Pat. Nos. 7,582,298, 8,043,617 or 9,173,880), an anti-interleukin 33 (e.g., anti-IL33 antibody as described in U.S. Pat. Appln. Pub. Nos. US2014/0271658A1 or US2014/0271642A1), an anti-Respiratory syncytial virus antibody (e.g., anti-RSV antibody as described in U.S. Pat. Appln. Pub. No. US2014/0271653A1), an anti-Cluster of differentiation 3 (e.g., an anti-CD3 antibody, as described in U.S. Pat. Appln. Pub. Nos. US2014/0088295A1 and US20150266966A1, and in U.S. Application No. 62/222,605), an anti-Cluster of differentiation 20 (e.g., an anti-CD20 antibody as described in U.S. Pat. Appln. Pub. Nos. US2014/0088295A1 and US20150266966A1, and in U.S. Pat. No. 7,879,984), an anti-Cluster of Differentiation-48 (e.g., anti-CD48 antibody as described in U.S. Pat. No. 9,228,014), an anti-Fel d1 antibody (e.g., as described in U.S. Pat. No. 9,079,948), an anti-Middle East Respiratory Syndrome virus (e.g., an anti-MERS antibody), an anti-Ebola virus antibody (e.g., Regeneron's REGN-EB3), an anti-CD19 antibody, an anti-CD28 antibody, an anti-IL1 antibody, an anti-IL2 antibody, an anti-IL3 antibody, an anti-IL4 antibody, an anti-IL5 antibody, an anti-IL6 antibody, an anti-IL7 antibody, an anti-Erb3 antibody, an anti-Zika virus antibody, an anti-Lymphocyte Activation Gene 3 (e.g., anti-LAG3 antibody or anti-CD223 antibody) and an anti-Activin A antibody. Each U.S. patent and U.S. patent publication mentioned in this paragraph is incorporated by reference in its entirety.

In some embodiments, a target molecule (e.g., a bispecific antibody) is selected from the group consisting of an anti-CD3×anti-CD20 bispecific antibody, an anti-CD3×anti-Mucin 16 bispecific antibody, and an anti-CD3×anti-Prostate-specific membrane antigen bispecific antibody. In some embodiments, the target molecule is selected from the group consisting of alirocumab, sarilumab, fasinumab, nesvacumab, dupilumab, trevogrumab, evinacumab, and rinucumab.

In some embodiments, the target molecule is a recombinant protein that contains an Fc moiety and another domain, (e.g., an Fc-fusion protein). In some embodiments, an Fc-fusion protein is a receptor Fc-fusion protein, which contains one or more extracellular domain(s) of a receptor coupled to an Fc moiety. In some embodiments, the Fc moiety comprises a hinge region followed by a CH2 and CH3 domain of an IgG. In some embodiments, the receptor Fc-fusion protein contains two or more distinct receptor chains that bind to either a single ligand or multiple ligands. For example, an Fc-fusion protein is a TRAP protein, such as for example an IL-1 trap (e.g., rilonacept, which contains the IL-1RAcP ligand binding region fused to the Il-1R1 extracellular region fused to Fc of hIgG1; see U.S. Pat. No. 6,927,004, which is incorporated by reference in its entirety), or a VEGF trap (e.g., aflibercept or ziv-aflibercept, which contains the Ig domain 2 of the VEGF receptor Flt1 fused to the Ig domain 3 of the VEGF receptor Flk1 fused to Fc of hIgG1; see U.S. Pat. Nos. 7,087,411 and 7,279,159, both of which are incorporated by reference in their entireties). In other embodiments, an Fc-fusion protein is a ScFv-Fc-fusion protein, which contains one or more of one or more antigen-binding domain(s), such as a variable heavy chain fragment and a variable light chain fragment, of an antibody coupled to an Fc moiety.

The term "chromatography," as used herein, refers to any process which separates components of a mobile phase (e.g., a mixture or solution containing multiple constituents) by passing the mobile phase through a medium such that the constituents of the mobile phase pass through the medium at different rates, including, but not limited to, column chromatography, planar chromatography, thin layer chromatography, displacement chromatography, gas chromatography, affinity chromatography (e.g., Protein A or Protein L), ion-exchange chromatography, size-exclusion chromatography, reverse phase chromatography, hydrophobic interaction chromatography (HIC), fast protein liquid chromatography, high-performance liquid chromatography, countercurrent chromatography, periodic counter-current chromatography, chiral chromatography, or mixed-mode chromatography. While embodiments herein may be disclosed with respect to an exemplary type of chromatography process or apparatus, for example, column chromatography, embodiments disclosed herein may be applicable to any type of chromatography.

The systems and methods of the present disclosure include methods and systems for studying the effect of chromatographic column integrity on the production of biopharmaceutical products. Chromatographic columns that are compatible with the methods and systems herein include any column suitable for separating and/or purifying components of a mobile phase.

A chromatographic column may comprise chromatography media. For example, chromatographic columns may include amino acid media, ligand-specific media, immunoaffinity media, ion affinity media, hydrophobic interaction media, and/or charged media. The media can be in the form of resin, beads, particles bound in a packed bed column format, a membrane, or in any format that can accommodate a mixture or other liquid comprising biopharmaceutical products. The media may include a support structure such as, for example, agarose beads (e.g., sepharose), silica beads, cellulosic membranes, cellulosic beads, hydrophilic polymer beads, or other compactable synthetic structure.

Chromatography media may include one or more ligands configured to interact with one or more components of a mobile phase, and a support structure supporting the one or more ligands. For example, chromatography media may include ligands including a quaternary amine, a Protein A-derived group, a Protein L-derived group, a phenyl group, a sulphopropyl group, a triazabicyclodecene (TBD) group, a trimethylammoniumethyl (TMAE) group, a dimethylaminoethyl (DMAE) group, a sulfoethyl group, or a combination thereof. The support structure may comprise cross-linked agarose, highly-linked agarose, silica, aluminum oxide, methacrylate, glass, polyvinyl ether, or a combination thereof.

Chromatographic columns used in the manufacture of biopharmaceutical products may be configured such that the media has a depth (e.g., bed height) of about 15 centimeters (cm) to about 30 cm. In some embodiments, a chromatographic column may be configured such that the inner diameter of the chromatographic column is about 15 cm to about 200 cm. In some embodiments, a chromatographic column has a total volume (e.g., total capacity for holding a mixture, mobile phase, or other substance) of about 25 liters (L) to about 277 L.

Chromatography systems may include, in addition to one or more columns, a detector. The detector may be any type of detector suitable for detecting one or more characteristics at the outlet of column. Such characteristics may include, for example, column exit conductivity, pH, optical density, and/or ultraviolet (UV) or visible light absorbance. In some embodiments, the detector may include an electrical conductivity detector, a UV detector, a fluorescence detector, a refractive detector, a pH detector, and/or a pressure gauge. For example, a detector may measure the absorbance of UV light (e.g., a wavelength of 280 nm), and the measured absorbance may correlate to a protein concentration of the mobile phase exiting the column.

Chromatography operations may typically include one or more steps, including, for example, one or more pre-equilibration steps, equilibration steps, loading steps, wash steps, elution steps, strip steps, and/or regeneration steps. The chromatography operations may be tracked and/or recorded with data collected from the detector at the outlet of a chromatographic column. For chromatography operations involved in the manufacture of biopharmaceutical products, monitoring the quality, consistency, and integrity of chromatography operations is required to ensure that the manufactured biopharmaceutical product meets internal quality assurance metrics, and standards of applicable regulatory bodies.

Generally, column integrity may be determined by the characteristics of how a mobile phase flows through the column's stationary phase (e.g., chromatography media). Signals detected from the detector may be plotted against time elapsed, and/or volume passed of the chromatography operation. These plots are referred to as chromatograms, and can be used to monitor the progress of a chromatography operation, and determine whether the chromatography operation is proceeding within acceptable operating parameters. For example, the presence of abnormal characteristics in a chromatogram may be indicative of diminished column integrity.

Column integrity refers to the ability of chromatographic column to perform at maximum efficiency. Variations in axial dispersion of chromatography media within a chromatographic column may affect the ability of the chromatographic column to perform at maximum efficiency. In addition or alternatively, variations in radial dispersion of chromatography media within the chromatographic column may affect the ability of the chromatography column to perform at maximum efficiency. Depending on the type of chromatographic column (e.g., type of chromatography media in the column), diminishment of column integrity may cause a lack of binding of components of the mobile phase to the column, a lack of separation between components of the mobile phase, and/or introduction of impurities into the mobile phase. When a chromatographic column is not operating at maximum efficiency, the column integrity of the chromatographic column is diminished.

The extent to which the column integrity of a chromatographic column is diminished may be quantified by determining the height equivalent of a theoretical plate (HETP) or number of theoretical plates of the chromatographic column. Compared to a column operating at maximum efficiency, chromatographic columns with diminished column integrity may have an increased HETP and/or a decreased number of theoretical plates. Other methods of quantifying column integrity include transition analysis, where peaks of a chromatogram are analyzed relative to historical or expected chromatogram peaks. Variation in the peaks of a chromatogram identified in transition analysis may indicate that the chromatographic column used to generate the chromatogram has diminished column integrity.

Diminished column integrity can result from disruptions in the chromatography media within the column, and these disruptions may negatively affect the ability of material to flow through the column. The disruptions that can cause diminished column integrity may be the result of repeated use of the chromatographic column. Disruptions in the chromatography media may cause material to flow through the column too quickly without contacting a sufficient quantity of chromatography media to effectively separate components of the introduced material. Additionally or alternatively, disruptions may block the flow of material through regions of the column, which can also lead to reduced efficiency of the column.

One type disruption within chromatography media, channeling, refers to the presence of voids within the chromatography media that may cause the mobile phase to advance through the chromatography media more rapidly than the average flow velocity of the chromatography operation. Chromatography media that becomes too dense may crack, which can lead to channeling and the formation of voids within chromatography media. Channeling can cause a lack of separation of components of the mobile phase, as the preferential flow of the mobile phase through voids of the chromatography media reduces the interaction between components of the mobile phase and the chromatography media.

Peak broadening and peak fronting in a chromatogram can be indicative of channeling in the chromatographic column used to generate the chromatogram. In addition or alternatively, bifurcation of peaks, erroneous peaks, shifted peak elution timing, and/or the absence of expected peaks can be indicative of channeling.

Another type of disruption within chromatography media, fouling, refers to pores or flowpaths of the chromatography media being blocked. For example, support structures of the chromatography media may become embedded in a filter screen within the chromatography column. The embedded media can prevent a mobile phase from flowing through portions of the chromatography column. Poor flow caused by blockages may lead to the formation of a biofilm or other growth that further disrupts movement of a mobile phase through the chromatographic column. Fouling may cause a first portion of a mobile phase to flow slower than a second portion of the mobile phase. The resulting lag of elution of the mobile phase through the column can result in poor separation of mobile phase components. The lag of elution may also cause peak broadening and peak tailing. Therefore, detection of peak broadening, peak tailing, and/or poor resolution of peaks, can be indicative of fouling.

Diminished column integrity may be detected by the presence of asymmetrical chromatogram peaks. For example, a chromatogram plotted based on a chromatography operation utilizing a column that has diminished column integrity, can include fronted and/or tailed peaks. Peak fronting refers to an asymmetrical peak, where the front half of a chromatography peak is broader than the back half of the chromatography peak. Peak tailing refers to an asymmetrical peak, wherein the back half of the chromatography peak is broader than the front half of the chromatography peak.

Peak asymmetry may be quantified by one or more peak symmetry metrics, such as, for example, an asymmetry factor. An asymmetry factor (a) of a peak may be calculated according to Equation 1, where $b_{h\,\%}$ is the width of the back half of the peak at h % of the peak height, and $f_{h\,\%}$ is the width of the front half of the peak at h % of the peak height.

$$a = \frac{b_{h\,\%}}{f_{h\,\%}} \quad \text{Equation 1}$$

An example of an asymmetry calculation at 5% of the peak height is shown in FIG. 1. The peak shown in FIG. 1 is symmetrical, and therefore, the width of the front half of the peak at 5% of the peak height, $f_{5\%\,h}$, is equal to the width of the back half of the peak at 5% of the peak height, $b_{5\%\,h}$. The asymmetry factor (a) of a symmetrical peak is 1.0. Peaks that are fronted will have an asymmetry factor less than 1.0, and peaks that are tailed will have an asymmetry factor greater than 1.0.

Figure 2:
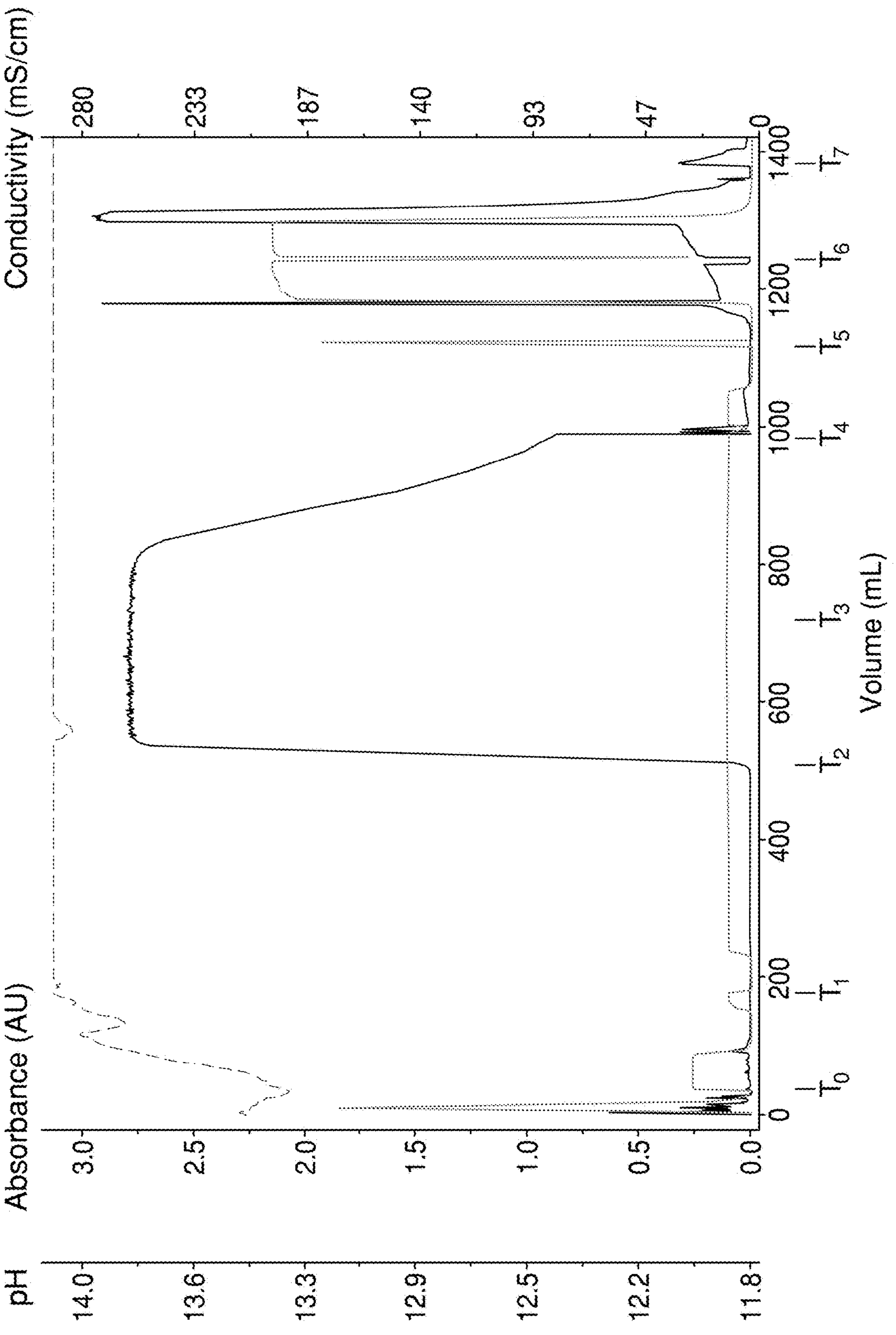
FIG. 2 is a chromatogram generated during a chromatography operation using a hydrophobic interaction chromatography column, according to aspects of the present disclosure.

FIG. 2 depicts an exemplary chromatogram of a chromatography operation using a hydrophobic interaction chromatography column. The chromatography operation shown in FIG. 2 is a flow-through process, where collection of the eluate occurs while the mobile phase (e.g., a mixture including biopharmaceutical products) and a wash buffer are introduced into the column. The collected eluate includes the desired biopharmaceutical product, while undesirable molecules (e.g., host cell protein) remain bound to the column. Subsequent washing and stripping steps remove the undesirable molecules bound to the column, so that it may be regenerated and re-used. The ultraviolet absorbance (black line), conductivity (grey line), and pH (dashed line) of the solution exiting the column are measured by one or more detectors, and plotted against volume passed through the column, to generate the chromatogram shown in FIG. 2.

Events related to the chromatography operation are marked along the x-axis. At $T_0$, the pre-equilibration step begins, followed by equilibration step beginning at $T_1$. The mixture including the biopharmaceutical product is introduced at $T_2$, and collection of the eluate begins. After the mixture is introduced into the column, a wash buffer is introduced, at $T_3$. Collection of the eluate ends at $T_4$. One or more stripping buffers are introduced to the column at $T_5$, $T_6$, and $T_7$.

Figure 3:
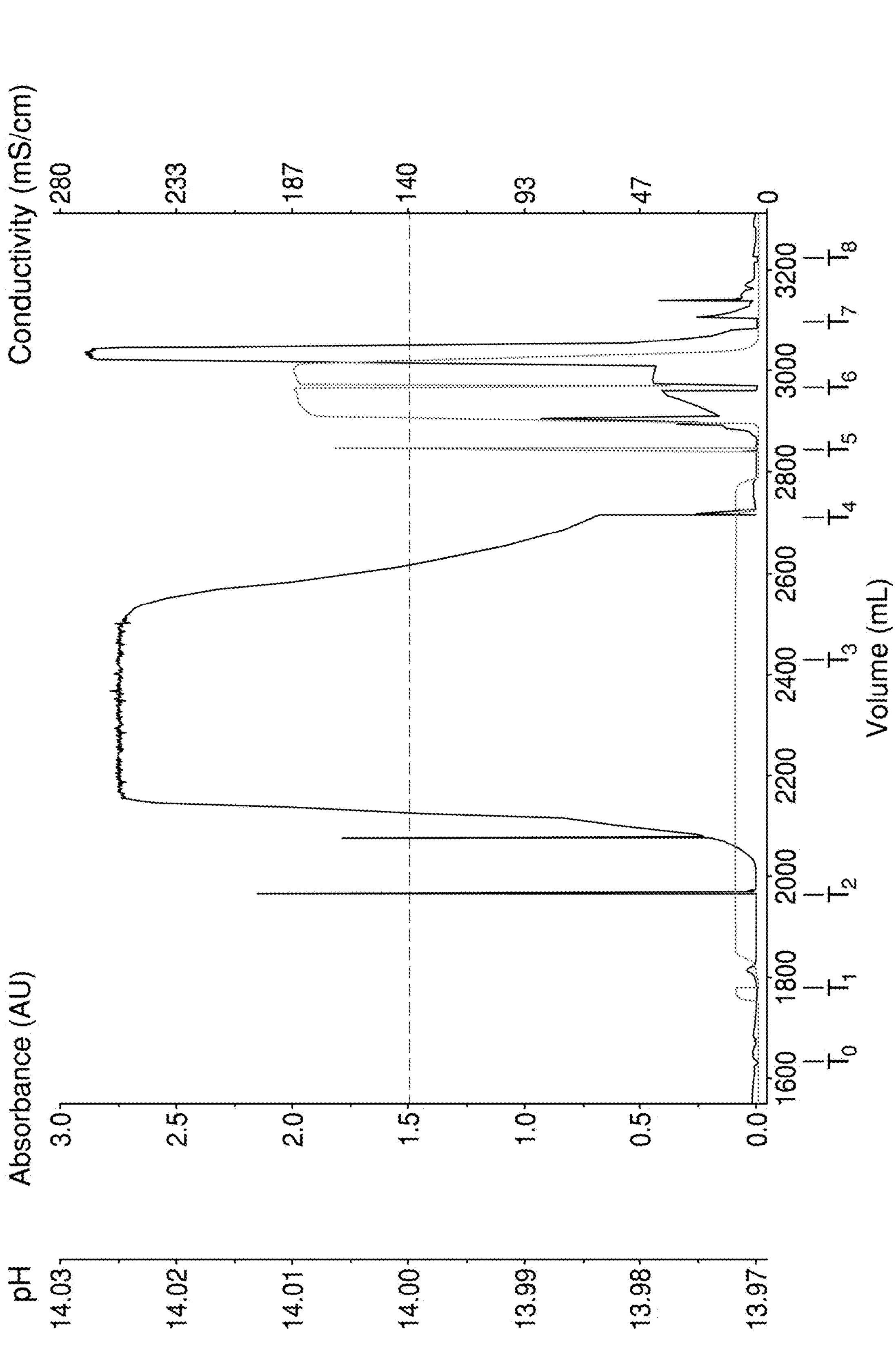
FIG. 3 is a chromatogram generated during a chromatography operation using a hydrophobic interaction chromatography column, according to aspects of the present disclosure.

The chromatogram shown in FIG. 3 is exemplary of a chromatogram generated during a chromatography operation including a hydrophobic interaction chromatography column that has diminished column integrity. Similar to the chromatogram shown in FIG. 2, at $T_0$, the pre-equilibration step begins, followed by equilibration step beginning at $T_1$. The mixture including the biopharmaceutical product is introduced at $T_2$, and collection of the eluate begins. After the mixture is introduced into the column, a wash buffer is introduced, at $T_3$. Collection of the eluate ends at $T_4$. One or more stripping buffers are introduced to the column at $T_5$, $T_6$, and $T_7$. Still referring to FIG. 3, the black line represents the ultraviolet absorbance, the grey line represents conductivity, and the dashed line represents pH.

Characteristics of the chromatogram can be monitored or analyzed to determine if the chromatographic column is operating within intended parameters, or if the integrity of the column has diminished. For example, referring to FIG. 2, the absorbance increases almost instantly after the mixture including the biopharmaceutical product is introduced into the column. Compared to the chromatogram shown in FIG. 2, the absorbance peak of the chromatogram shown in FIG. 3 has a more gradually sloping increase near $T_2$. Additionally, the absorbance peak of the chromatogram in FIG. 3 is less symmetrical than the absorbance peak of the chromatogram in FIG. 2. The sloping increase of the absorbance peak and asymmetrical peak distribution are indicative of diminished column integrity.

Figure 4:
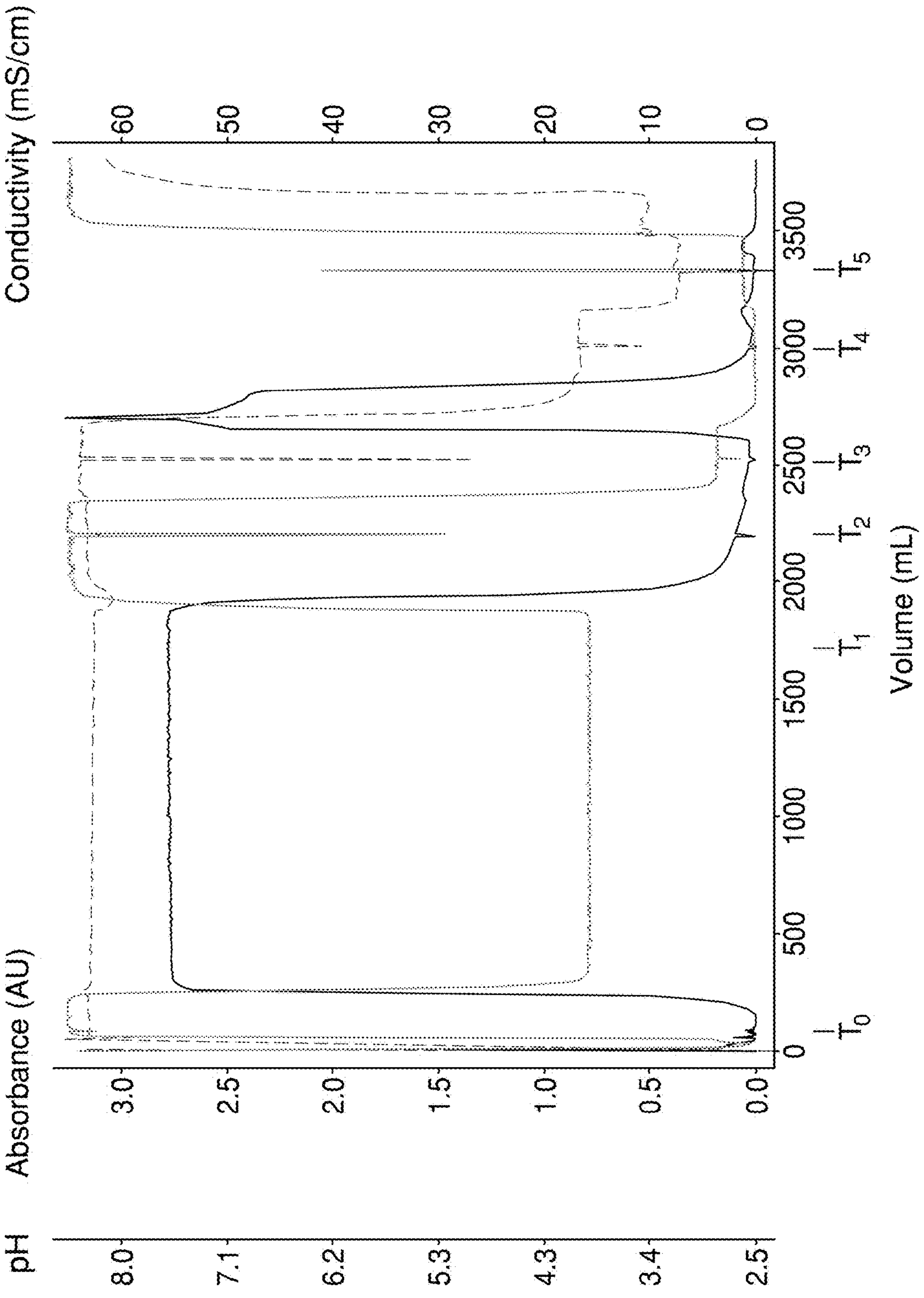
FIG. 4 is a chromatogram generated during a chromatography operation using an affinity chromatography column, according to aspects of the present disclosure.

FIG. 4 depicts an exemplary chromatogram of a chromatography operation using an affinity chromatography column. The black line represents the ultraviolet absorbance, the grey line represents conductivity, and the dashed line represents pH, and events of the affinity chromatography operation are marked on the x-axis. At $T_0$, the mixture including the biopharmaceutical product is introduced into the column, which may be referred to as the loading step. At $T_1$ and $T_2$, one or more wash buffers are introduced into the column. At $T_3$, an elution buffer is introduced into the column and collection of the eluate begins. One or more wash and/or strip buffers may be introduced into the column after the elution buffer. At $T_4$, collection of the eluate stops, and at $T_5$, an equilibrating buffer is introduced into the column.

Figure 5:
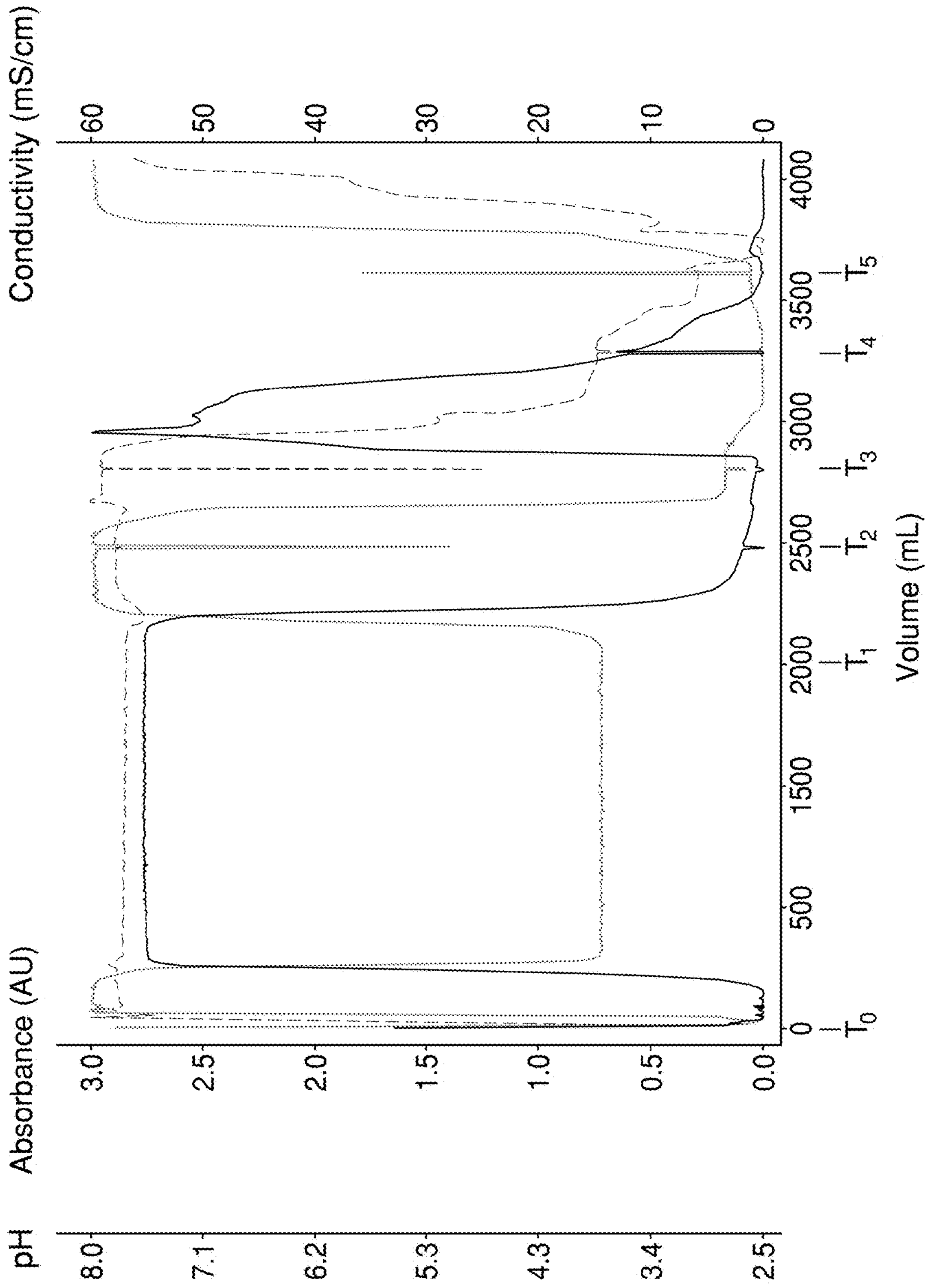
FIG. 5 is a chromatogram generated during a chromatography operation using an affinity chromatography column, according to aspects of the present disclosure.

The chromatogram shown in FIG. 5 is exemplary of a chromatogram generated during a chromatography operation including an affinity column that has diminished column integrity. Similar to the chromatogram shown in FIG. 4, the black line represents the ultraviolet absorbance, the grey line represents conductivity, the dashed line represents pH, and events of the affinity chromatography operation are marked on the x-axis. At $T_0$, the mixture including the biopharmaceutical product is introduced into the column, which may be referred to as the loading step. At $T_1$ and $T_2$, one or more wash buffers are introduced into the column. At $T_3$, an elution buffer is introduced into the column and collection of the eluate begins. One or more wash and/or strip buffers may be introduced into the column after the elution buffer. At $T_4$, collection of the eluate stops, and at $T_5$, an equilibrating buffer is introduced into the column.

The absorbance peak of FIG. 5 corresponding to elution (i.e., the peak between $T_3$ and $T_4$) is broader than the absorbance peak of FIG. 4 corresponding to elution (i.e., the peak between $T_3$ and $T_4$). Additionally, the absorbance peak of FIG. 5 corresponding to elution is more asymmetrical than the absorbance peak corresponding to elution of FIG. 4. The absorbance peak corresponding to elution shown in FIG. 6 is tailed (i.e., the back half is broader than the front half).

Figure 6:
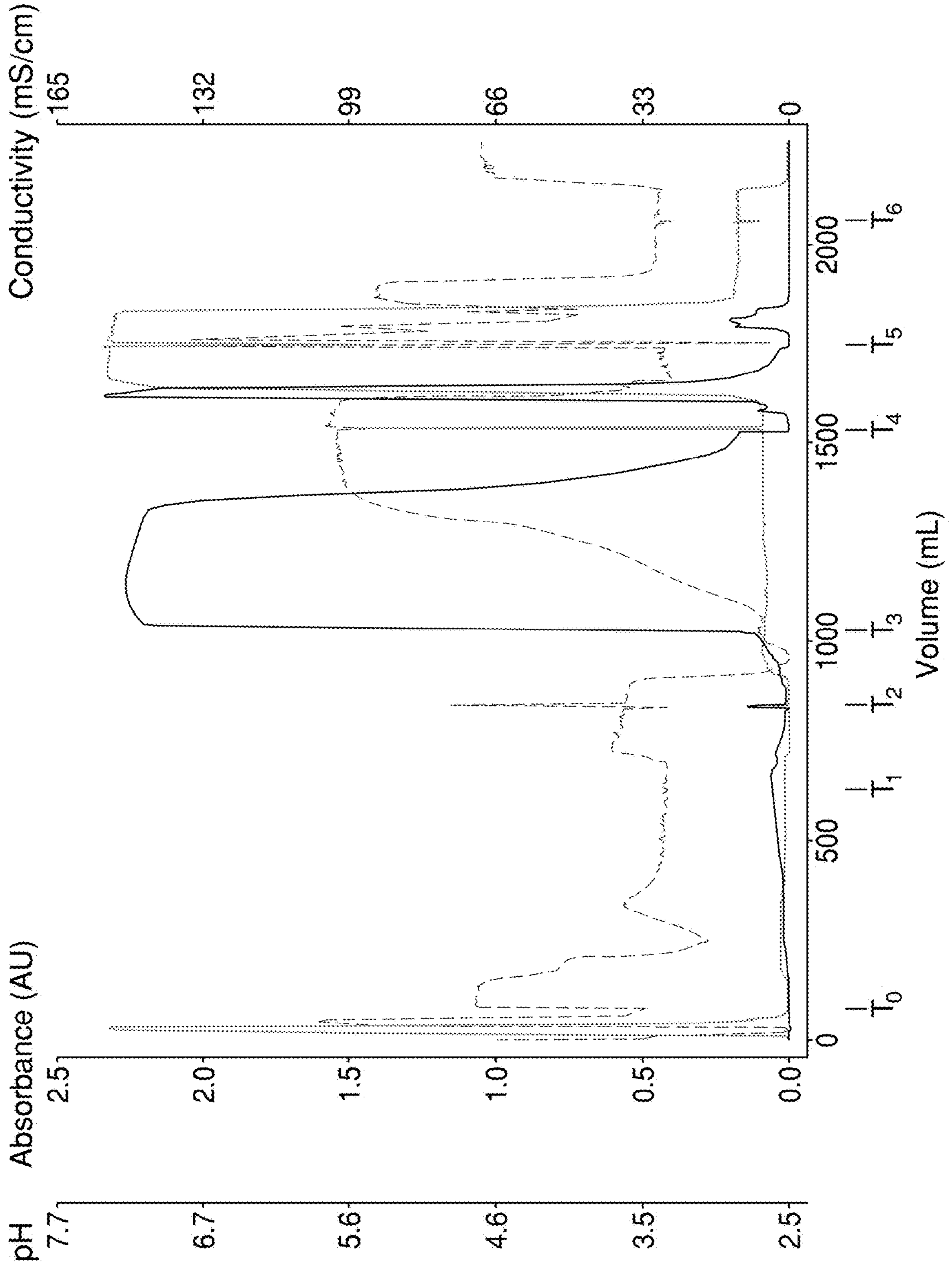
FIG. 6 is a chromatogram generated during a chromatography operation using an ion exchange chromatography column, according to aspects of the present disclosure.

FIG. 6 depicts an exemplary chromatogram of a chromatography operation using a cation exchange chromatography column. The black line represents the ultraviolet absorbance, the grey line represents conductivity, and the dashed line represents pH, and events of the ion exchange chromatography operation are marked on the x-axis. At $T_0$, the mixture including the biopharmaceutical product is introduced into the column, which may be referred to as a loading step. At $T_1$, a wash buffer is introduced into the column, and at $T_2$, an elution buffer is introduced into the column. At $T_3$, the collection of the eluate begins, and at $T_4$, the collection of the eluate ends. At $T_5$ and $T_6$, one or more equilibration buffers may be introduced into the column.

Figure 7:
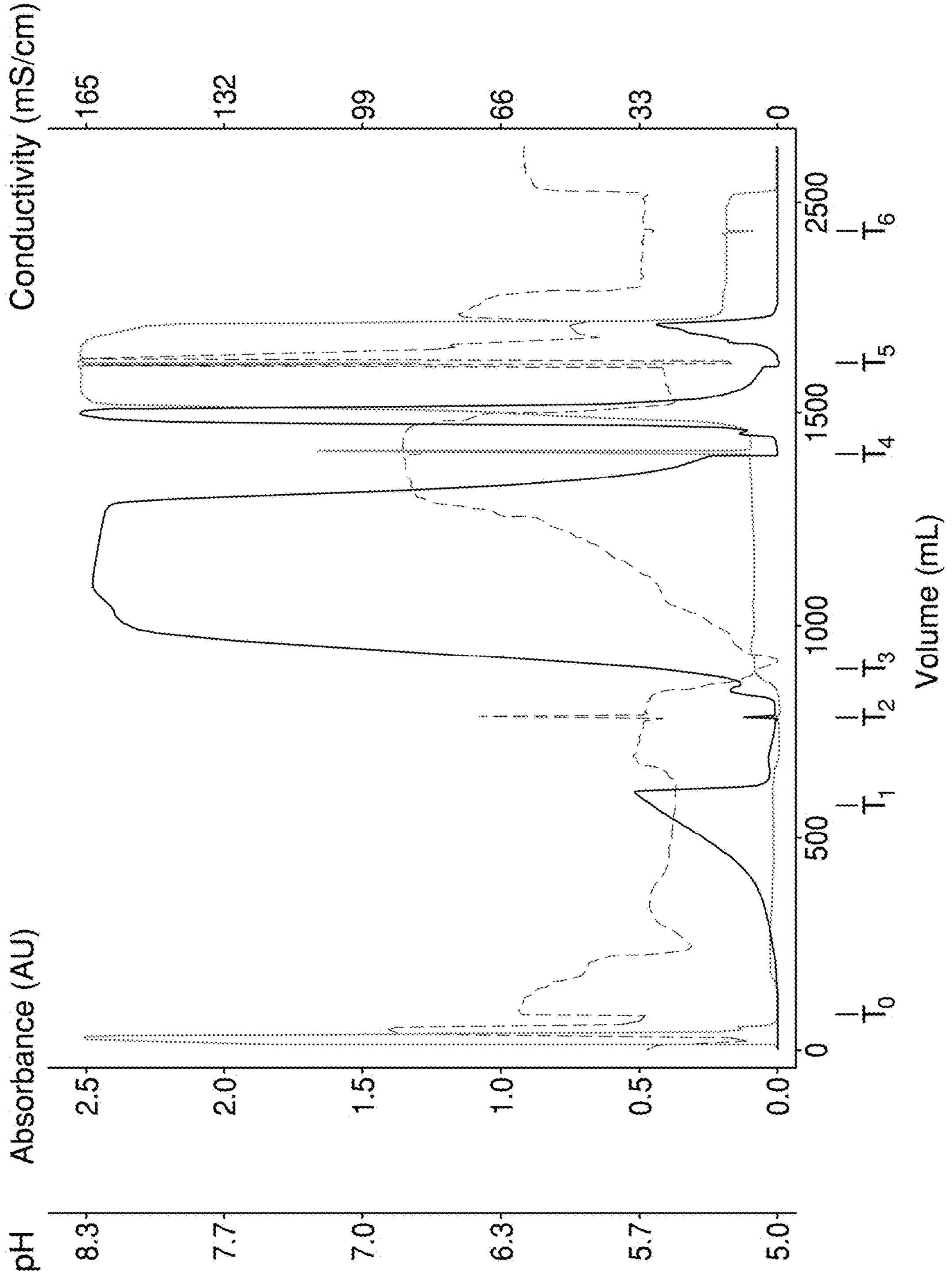
FIG. 7 is a chromatogram generated during a chromatography operation using an ion exchange chromatography column, according to aspects of the present disclosure.

The chromatogram shown in FIG. 7 is exemplary of a chromatogram generated during a chromatography operation including a cation exchange column that has diminished column integrity. Similar to the chromatogram shown in FIG. 6, the black line represents the ultraviolet absorbance, the grey line represents conductivity, and the dashed line represents pH, and events of the ion exchange chromatography operation are marked on the x-axis. At $T_0$, the mixture including the biopharmaceutical product is introduced into the column, which may be referred to as a loading step. At $T_1$, a wash buffer is introduced into the column, and at $T_2$, an elution buffer is introduced into the column. At $T_3$, the collection of the eluate begins, and at $T_4$, the collection of the eluate ends. At $T_5$ and $T_6$, one or more equilibration buffers may be introduced into the column.

The absorbance peak corresponding to elution (i.e., the peak between $T_2$ and $T_4$) shown in FIG. 7 is broader compared to the absorbance peak corresponding to elution (i.e., the peak between $T_2$ and $T_4$) shown in FIG. 6. Additionally, the absorbance peak shown in FIG. 7, at approximately $T_1$ indicates load breakthrough. Stated differently, during the loading step, proteins including biopharmaceutical product flowed through the column instead of binding to the column, as intended. The load breakthrough is a result of a loss of column integrity.

As described above, a diminishment of column integrity can be determined by monitoring signals from detectors (e.g., plotting conductivity, absorbance, and/or pH as a function of volume passed through the column). Certain characteristics of chromatogram peaks can be indicative of diminished column integrity. For example, broad elution peaks, fronted peaks, tailed peaks, and load breakthrough, can all be indicative of diminished column integrity.

During manufacture of biopharmaceutical products, signals generated during chromatography operations by a detector may be monitored to assess the column integrity of the columns used in the chromatography operations. For example, a chromatogram plotted based on a signal received from a detector may be monitored for the presence of indicators of diminished column integrity. If a loss of column integrity is detected, the column may be considered unsuitable for use. Product that contacts a column that is considered unsuitable for use may be rendered unusable. Additionally, production must be stopped while the unsuitable column is regenerated, repaired, or replaced. The unusable product and halted production time increase the costs and time required for the manufacture of biopharmaceutical products.

Because the effects of diminished chromatographic column integrity are poorly understood, a greater amount of biopharmaceutical products may be considered unusable by quality control and regulatory standards, than are actually affected by diminished chromatographic column integrity. If the relationship between loss of chromatographic column integrity and quality of the manufactured biopharmaceutical products were better understood, more narrowly tailored chromatographic process controls could be implemented. The narrowly tailored chromatographic process controls would result in less wasted product and less manufacturing interruptions, compared to conventional chromatographic process controls.

Factors limiting the understanding of the relationship between loss of chromatographic column integrity and quality of the manufactured biopharmaceutical products include: the cost of investigating the relationship and the lack of precision of assessing failed columns. For example, there are currently no models or commercially available analogs for columns with diminished column integrity. Conventional investigations into the effects of column integrity require columns that have naturally lost column integrity, over the course of multiple chromatography processes. Therefore, the columns used in such investigations are poorly controlled, and are rarely uniform in their patterns of disruptions within the chromatography media. Additionally, the amount of biopharmaceutical product, as well as the operation of manufacturing scale equipment for the investigations into the effects and mechanisms of diminished column integrity can be cost prohibitive.

The interactions between a biopharmaceutical product and chromatography media may be dependent on the identity, structure, and characteristics of the biopharmaceutical product. For example, the distribution and magnitude of hydrophobic regions within a biopharmaceutical product may affect the interactions between chromatography media and the product. In addition or alternatively, the feed stream composition of a mobile phase may depend on the structure and/or characteristics of the biopharmaceutical product within the mobile phase. As a result, the relationship between chromatographic column integrity and quality of manufactured biopharmaceutical products may be unique to each product and chromatography operation.

Accordingly, there exists a need for systems and methods for modeling chromatography systems with a column exhibiting diminished column integrity. In particular, there exists a need for analogs of chromatographic columns with diminished column integrity, and systems for investigating the effect of column integrity on processed biopharmaceutical products.

The present disclosure includes analogs for chromatographic columns with diminished column integrity. Additionally, the present disclosure includes methods of analyzing the effect of column integrity on the quality of processed biopharmaceutical products, and methods of developing chromatography process controls. For example, a system may comprise an analog that is configured to cause a mobile phase passed through the analog to behave analogously to a mobile phase passing through chromatographic column with diminished column integrity.

In some embodiments, an analog may include chromatography media, such as, for example, amino acid media, ligand-specific media, immunoaffinity media, ion affinity media, hydrophobic interaction media, and/or charged media. An analog may also include one or more regions that simulate, model, and/or mimic, a region of a chromatographic column with a disruption to the chromatography media. For example, the analog may include a region that simulates, models, and/or mimics channeling. Additionally or alternatively, the analog may include a region that simulates, models, and/or mimics fouling.

The one or more regions of an analog that simulate, model, and/or mimic a region of a chromatographic column with a disruption to the chromatography media may include one or more of discs, blocks, voids, lumens, tubes, or other structures that can disrupt chromatography media.

The analog may be configured to be compatible with standard chromatography systems. For example, chromatography systems that include pumps, inlets, a detector, and one or more chromatography columns, may have removable, interchangeable, and/or replaceable columns. Analogs of the present disclosure may be configured such that they may be used in place of a chromatography column within a chromatography system.

Figure 8A:
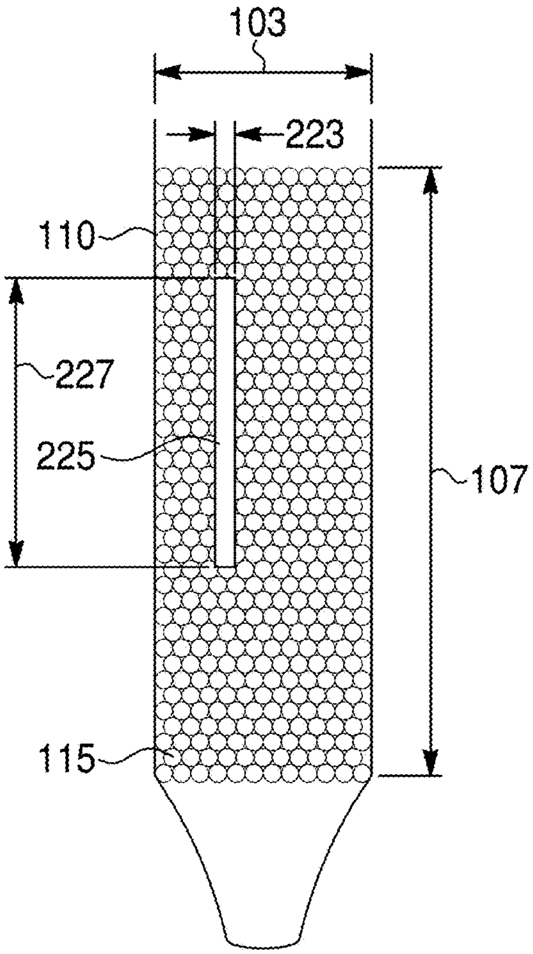
FIG. 8A is a schematic representation of a cross-section of a channeling analog, according to aspects of the present disclosure.
Figure 8B:
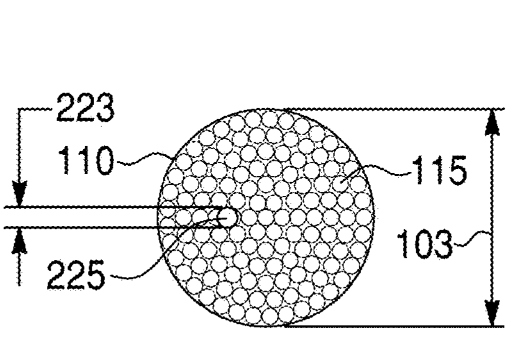
FIG. 8B is a perpendicular cross-section of the analog of FIG. 8A.

Referring to FIGS. 8A and 8B, a channeling analog 110 may include chromatography media 115 and a void 225. The void 225 is a region of analog 110 that does not include chromatography media 115. In some embodiments, void 225 may be formed as the lumen of a tube, a channel, or other spaced formed within a three-dimensional structure inserted within analog 110. For example, a tube comprising glass, stainless steel, polystyrene, plastic, or other suitable rigid material that is impermeable and chemically inert to the mobile phase may be inserted into the chromatography media 115. Void 225 may comprise space within a tube or other three-dimensional structure within the chromatography media 115 of analog 110. Void 225 may include one or more screens that are permeable to the mobile phase. For example, a top opening of void 225 may include a first screen and a bottom opening of void 225 may include a second screen.

The analog 110 may be configured such that the chromatography media 115 has a bed height 107 (e.g., depth) of about 15 cm to about 30 cm. The analog 110 may have an inner diameter 103 of about 1 cm to about 14 cm. In some embodiments, the analog 110 may have a total volume (e.g., total capacity for holding a mixture, mobile phase, or other substance) of about 15 milliliters (mL) to 4600 mL.

Void 225 may have an elongated shape (e.g., a cylindrical shape). A longitudinal axis of void 225 may be parallel to a longitudinal axis of analog 110. For example, the longitudinal axis of void 225 may be parallel to a sidewall of analog 110. Void 225 may have a width 223 (e.g., diameter) of about 0.5 cm to about 1.0 cm. Void 225 may have a height 227 of about 1.0 cm to about 10 cm.

The width 223 of void 225 may be about 10 percent to about 40 percent of the inner diameter 103 of analog 110. The height 227 of void 225 may be about 10 percent to about 30 percent of the bed height 107 of analog 110.

Void 225 may be positioned about 1 cm to about 29 cm from a bottom edge of chromatography media 115. In some embodiments, void 225 may be positioned about 1 cm to about 29 cm from a top of edge of chromatography media 115. Void may be positioned about 1 cm to about 6 cm from a sidewall of analog 110.

Although the channeling analog 110 shown in FIGS. 8A and 8B includes one void 225, this is only one example. Channeling analog 110 may include 2, 3, 4, or more voids 225, depending on the extent of diminished column integrity being simulated. For example, to simulate or model a chromatographic column with a severe loss of column integrity, an analog 110 may include more than one void 225. Additionally or alternatively, the size of the one or more voids 225 may be adjusted to achieve the desired level of disruption within the chromatography media 115. Larger and more numerous voids 225 simulate a greater diminishment in column integrity.

Figure 9A:
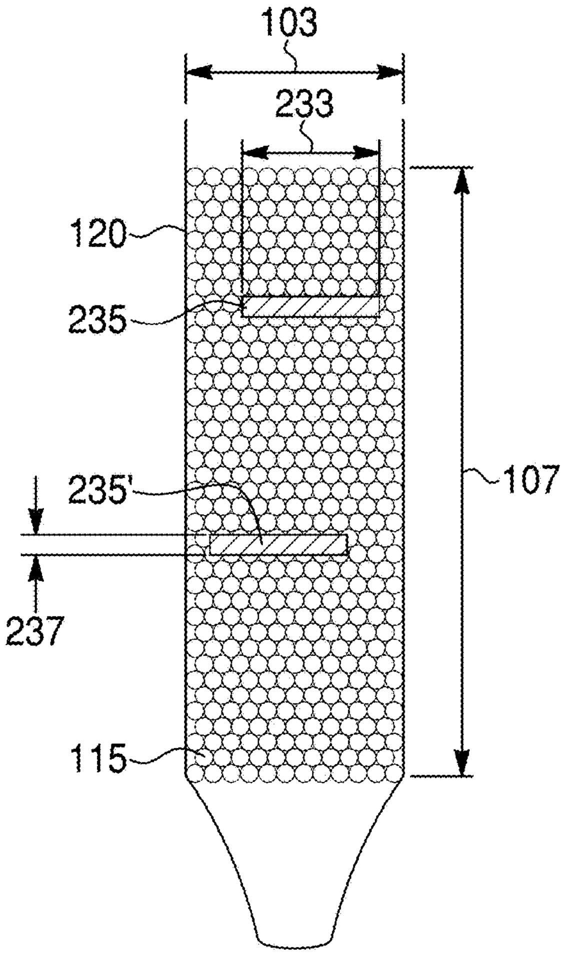
FIG. 9A is a schematic representation of a cross-section of a fouling analog, according to aspects of the present disclosure.
Figure 9B:
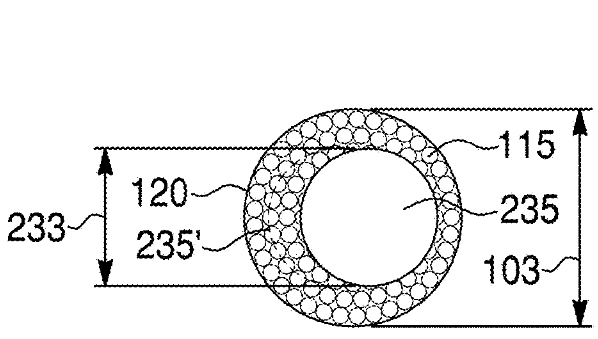
FIG. 9B is a perpendicular cross-section of the analog of FIG. 9A.

Referring to FIGS. 9A and 9B, a fouling analog 120 may include chromatography media 115 and one or more blocks 235, 235'.

The analog 120 may be configured such that the chromatography media 115 has a bed height 107 (e.g., depth) of about 15 cm to about 30 cm. The analog 120 may have an inner diameter 103 of about 1 cm to about 14 cm. In some embodiments, the analog 120 may have a total volume (e.g., total capacity for holding a mixture, mobile phase, or other substance) of about 15 mL to about 4600 mL.

The blocks 235, 235' are structures inserted within the analog 120 that do not include chromatography media 115, and obstruct and/or prevent the passage of a mobile phase through the space occupied by blocks 235, 235'. A block 235 may comprise stainless steel, glass, polystyrene, plastic, or another material with suitable properties. For example, block 235 may comprise a material that is impermeable to the chromatography media. In addition or alternatively, suitable materials for block 235 may be impermeable to mobile phases and strong enough to not be deformed during the packing of chromatography media in the analog 120.

Still referring to FIGS. 9A and 9B, block 235 may have a disc shape, including a thickness 237 between a circular top surface and a circular bottom surface. In some embodiments, the top surface and bottom surface of block 235 may have a trigonal shape, an ovular shape, a rectangular shape, or other configuration. Although the blocks 235, 235' shown in FIGS. 9A and 9B have a greater width 233 than thickness 237, this is one example. In other embodiments, block 235 may have a thickness 237 greater than a width 233.

Block 235 may have a thickness 237 of about 0.2 millimeters (mm) to about 0.6 mm. Block 235 may have a width 233 of about 0.5 cm to about 2.5 cm. The width 233 of block 235 may be about 50 percent to about 90 percent of the inner diameter 103 of analog 120. The height 237 of block 235 may be about 0.001 percent to about 0.1 percent of the bed height 107 of analog 120.

A block 235 closest to the bottom edge of chromatography media 115 may be positioned at least about 0.5 cm to about 1.0 cm from the bottom edge of chromatography media 115. In some embodiments, a block 235 closest to a top edge of chromatography media 115 may be positioned at least about 0.5 cm to about 1.0 from the top of edge of chromatography media 115. Block may be positioned about 0.5 cm to about 5 cm from a nearest sidewall of analog 120.

Although the fouling analog 120 shown in FIGS. 9A and 9B includes two blocks, this is one example. Fouling analog 110 may include 1, 3, 4, 5, 6, 7, 8, 9, 10, or more blocks 235, depending on the extent of diminished column integrity being simulated. Additionally or alternatively, the size of the one or more blocks 235 may be adjusted to achieve the desired level of disruption within the chromatography media 115. Larger and more numerous blocks 235 simulate a greater diminishment in column integrity.

Referring to FIGS. 9A and 9B, in embodiments where analog 120 includes a plurality of blocks 235, 235', the blocks may be positioned parallel to each other. In some embodiments, a plurality of blocks 235, 235' may be positioned within analog 120 such that at least two blocks 235, 235' are not parallel to each other. Each block 235, 235' of the plurality of blocks 235, 235', may have the same shape and size. In some embodiments, at least one block 235, 235' of the plurality of blocks 235, 235' has a different shape and/or size than at least one other block 235, 235'. Each block 235, 235' may be coaxial to each other (i.e., the center points of each block 235, 235' lie along a single axis of analog 120). In some embodiments, at least one block 235, 235' of the plurality of blocks 235' is at a different position within the chromatography media than at least one other block 235, 235' of the plurality of blocks 235, 235', relative to a central axis of analog 120.

As described above, analogs (e.g., channeling analogs 110 and fouling analogs 120) allow for the investigation into the effect of column integrity of a chromatographic column on the purity, yield, and quality of biopharmaceutical products processed using the chromatographic column. Analogs may be configured to simulate a desired level of column integrity, by, for example, altering the size, shape, and/or number of voids 225 and or blocks 235. The analogs may consistently and repeatedly allow mobile phases to pass through the analog analogously to how mobile phases pass through a chromatographic column with diminished column integrity. The consistent and repeatable nature of mobile phase flow through the analogs allows for the investigation of the mechanisms and effects of column integrity on the processing of biopharmaceutical products.

EXAMPLES

Before a chromatographic column is used in the manufacture of biopharmaceutical products, a pre-use assessment may be run on the column to determine whether a mobile phase is flowing through the column as intended. A pre-use assessment may include generating a baseline chromatogram with a column, and generating a chromatogram based on monitoring the conductivity of an eluate including a salt slug exiting the column. Comparing the baseline chromatogram with the monitored conductivity from eluate including the salt slug, may allow for a determination of whether the mobile phase is flowing through the column as intended. Characteristics of a peak corresponding to the salt slug may be compared to historical or expected data using a comparable chromatographic column.

For example, the peak start (e.g., the point where the signal first reaches at least 5% of the maximum peak height), the peak maximum, and/or the peak end (e.g., the point after the maximum peak height where the signal reaches 5% of the peak height) may be compared between the peak generated from the pre-use assessment protocol and historical peak data (e.g., peaks generated from unused columns or columns with confirmed performance efficiency). If one or more of the peak start, peak maximum, or peak end of a peak generated from the pre-use assessment protocol differs (e.g., differs by at least about 0.1 column volumes) from historical or expected peak data, the column used to generated the deviated peak may be considered unsuitable for use.

During the production of biopharmaceutical products, chromatographic columns exhibit channeling and/or blocking caused by disruption in the chromatography media may be detected by a pre-use assessment. For example, characteristics of a peak of a chromatogram generated using a chromatographic column exhibiting channeling may appear earlier, compared to historical peak data (e.g., peak fronting). Characteristics of a peak of a chromatogram using a chromatographic column exhibiting blocking may appear later, compared to historical peak data (e.g., peak tailing). To demonstrate that the analogs of the present disclosure simulate the flow of a mobile phase through a chromatographic column exhibiting channeling and/or blocking, pre-use assessments were run on analogs with multiple sizes and types of disruptions in the chromatography media.

One example of a pre-use assessment protocol, Pre-Use Assessment Protocol A includes generating a baseline chromatogram by passing 2.5 column volumes (CVs) of a buffer comprising 0.1 M sodium chloride into a chromatographic column, at a flow rate of 125 centimeters per hour (cm/hr), and monitoring the conductivity of the eluate exiting the column. Pre-Use Assessment Protocol A further includes generating a chromatogram by monitoring the conductivity of the eluate while: (a) introducing 0.01 CVs of a buffer comprising 1.0 M sodium chloride into the chromatographic column, and (b) washing the column with 0.1 M sodium chloride, at a flow rate of 125 cm/hr, until the 1.0 M sodium chloride pulse elutes and conductivity returns to the baseline level (e.g., the conductivity of a 0.1 M sodium chloride solution). According to Pre-Use Assessment Protocol A, characteristics of the peak corresponding to the 0.01 CVs of buffer comprising 1.0 M sodium chloride may be used to determine the relative efficiency of the chromatographic column. For example, characteristics of the peak corresponding to the 0.01 CVs of buffer comprising 1.0 M sodium chloride may be used to determine whether the chromatographic column includes disruptions (e.g., channeling or blocking) within the chromatography media.

Comparative Example

Figure 10A:
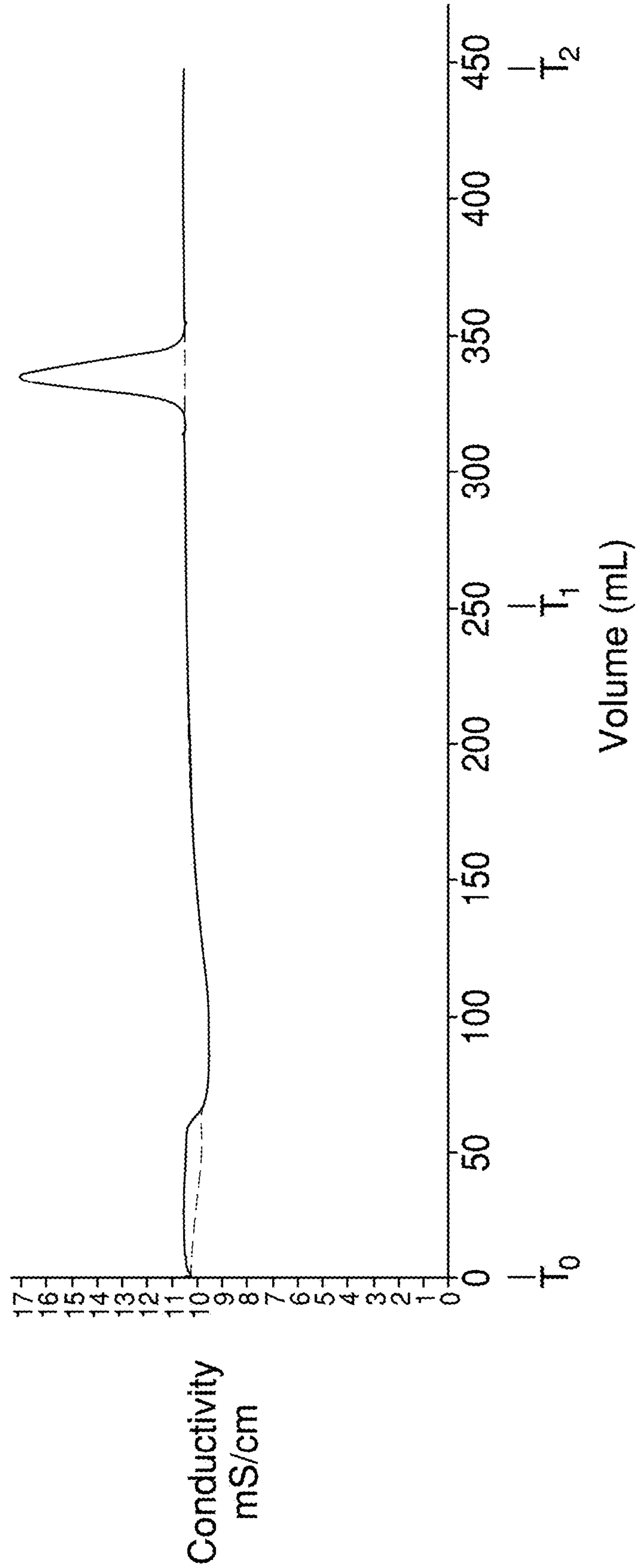
FIG. 10A is a chromatogram generated from a pre-use assessment of a chromatography column, according to aspects of the present disclosure.

FIG. 10A shows a chromatogram generated from Pre-Use Assessment Protocol A of a chromatographic column without disruptions introduced into the chromatography media. The column had a bed height of about 20 cm, an inner diameter of about 2.5 cm, and a volume of about 98.175 mL. The dashed line represents the measured conductivity from the baseline chromatogram and the solid line represents the measured conductivity from the eluate including the salt slug. The asymmetry of the elution peak, at 5% of peak height, was 1.17, as calculated according to Equation 1.

Example 1

Figure 10B:
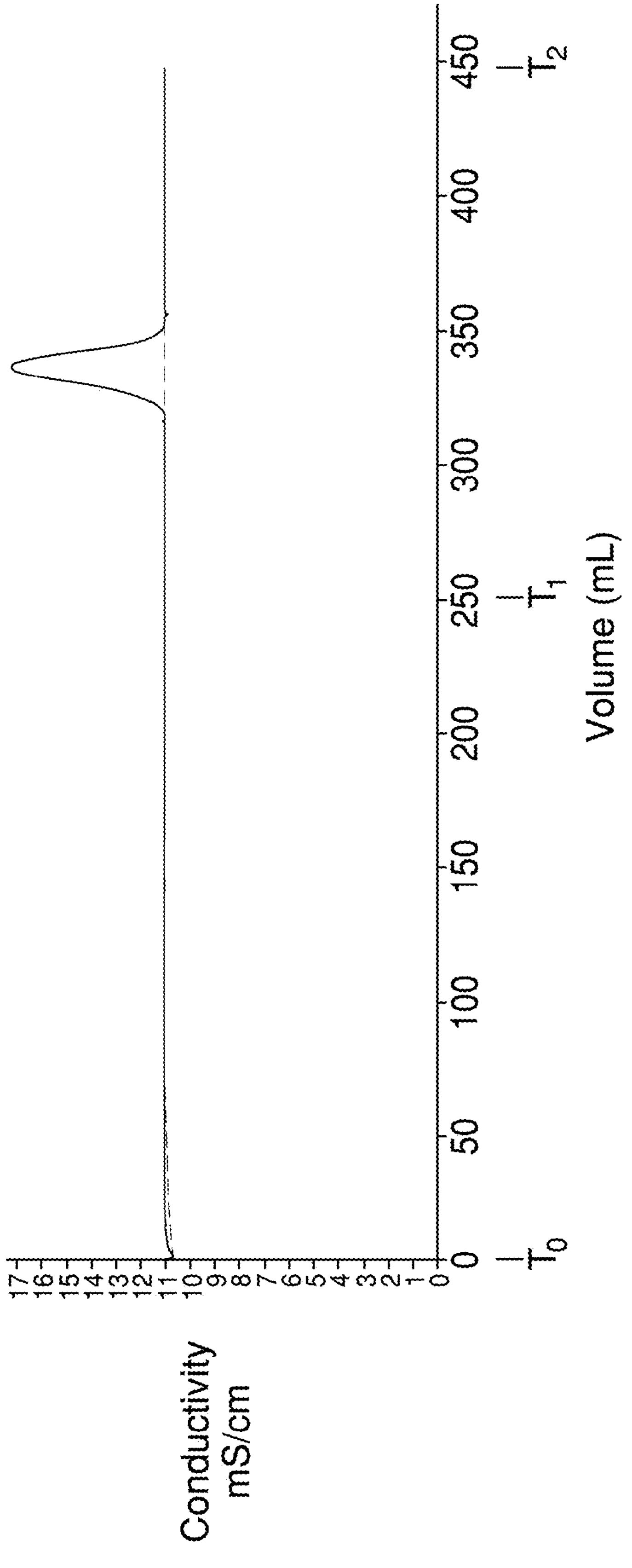
FIG. 10B is a chromatogram generated from a pre-use assessment of a channeling analog, according to aspects of the present disclosure.

FIG. 10B shows a chromatogram generated from Pre-Use Assessment Protocol A of a channeling analog, according to aspects of the present disclosure. The channeling analog had a bed height of about 20 cm, an inner diameter of about 2.5 cm, and a volume of about 98.175 mL, and included a stainless steel tube positioned parallel to a longitudinal axis of the column. The tube included a filter screen at a top opening and a filter screen at a bottom opening, to prevent infiltration of chromatography media into the tube. The space within the tube formed a void having a height of about 2 cm, and an inner diameter of about 0.7 cm. Referring to FIG. 10B, the dashed line represents the measured conductivity from the baseline chromatogram and the solid line represents the measured conductivity from the eluate including the salt slug. The asymmetry of the elution peak, at 5% of peak height, was 0.85, as calculated according to Equation 1. The asymmetry of 0.85 is less than the comparative example, confirming that the channeling analog results in peak fronting.

Example 2

Figure 10C:
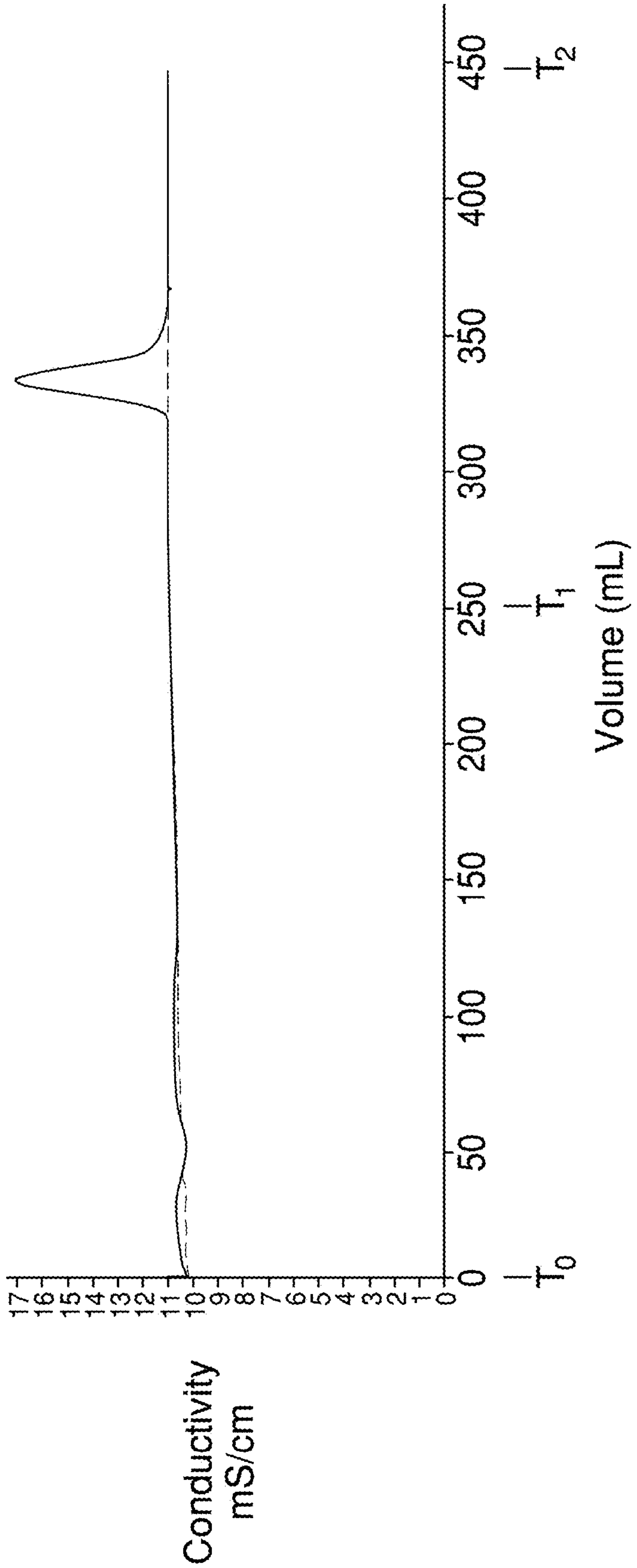
FIG. 10C is a chromatogram generated from a pre-use assessment of a fouling analog, according to aspects of the present disclosure.

FIG. 10C shows a chromatogram generated from Pre-Use Assessment Protocol A of a fouling analog, according to aspects of the present disclosure. The fouling analog had a bed height of about 20 cm, an inner diameter of about 2.5 cm, and a volume of about 98.175 mL, and included three polystyrene blocks. Each polystyrene block had an approximately circular shape, a thickness of about 0.2 mm, and a diameter of about 1.75 cm. The dashed line represents the measured conductivity from the baseline chromatogram and the solid line represents the measured conductivity from the eluate including the salt slug. The asymmetry factor of the elution peak, at 5% of peak height, was 1.53, as calculated according to Equation 1. The asymmetry factor of 1.53 is more than the comparative example, confirming that the fouling analog results in peak tailing.

Although the pre-use assessment chromatograms shown in FIGS. 10A-10C include lines for the baseline and eluate including the salt slug, a chromatogram of a pre-use assessment may alternatively be presented by plotting the difference of the baseline conductivity subtracted from the measured conductivity of the eluate including the salt slug.

Additional channeling and fouling analogs were prepared according to aspects of the present disclosure, and are described in Examples 3-10. All analogs described in Examples 3-10 comprise affinity chromatography media and/or ion exchange media. The analogs described in Examples 3-10 have a bed height of about 20 cm, an inner diameter of about 2.5 cm, and a volume of about 98.175 mL.

Example 3

A channeling analog was prepared including a void with a height of about 2.0 cm and a width of about 0.7 cm. The void was formed by inserting a tube comprising stainless steel into the chromatography media. The tube included a filter screen at the top opening and a filter screen at the bottom opening, to prevent intrusion of chromatography media into the void formed within the tube.

Example 4

A channeling analog was prepared including a void with a height of 3.0 cm and a width of about 0.7 cm. The void was formed by inserting a tube comprising stainless steel into the chromatography media. The tube included a filter screen at the top opening and a filter screen at the bottom opening, to prevent intrusion of chromatography media into the void formed within the tube.

Example 5

A channeling analog was prepared including a void with a height of 3.5 cm and a width of about 0.7 cm. The void was formed by inserting a tube comprising stainless steel into the chromatography media. The tube included a filter screen at the top opening and a filter screen at the bottom opening, to prevent intrusion of chromatography media into the void formed within the tube.

Example 6

A channeling analog was prepared including a void with a height of 4.0 cm and a width of about 0.7 cm. The void was formed by inserting a tube comprising stainless steel into the chromatography media. The tube included a filter screen at the top opening and a filter screen at the bottom opening, to prevent intrusion of chromatography media into the void formed within the tube.

Example 7

A fouling analog was prepared including three blocks, each having an approximately circular shape, a thickness of about 0.2 mm, and a diameter of about 1.75 cm. The blocks comprised polystyrene discs inserted into the chromatography media.

Examples 8

A fouling analog was prepared including four blocks, each having an approximately circular shape, a thickness of about 0.2 mm, and a diameter of about 1.88 cm. The blocks comprised polystyrene discs inserted into the chromatography media.

Examples 9

A fouling analog was prepared including six blocks, each having an approximately circular shape, a thickness of about 0.2 mm, and a diameter of about 2.00 cm. The blocks comprised polystyrene discs inserted into the chromatography media.

Examples 10

A fouling analog was prepared including eight blocks, each having an approximately circular shape, a thickness of about 0.2 mm, and a diameter of about 2.13 cm. The blocks comprised polystyrene discs inserted into the chromatography media.

FIGS. 11A-11H show chromatograms generated from Pre-Use Assessment Protocol A of the analogs of Examples 3-10, according to aspects of the present disclosure. For each plot in FIGS. 11A-11H, the dashed line represents the measured conductivity from the baseline chromatogram and the solid line represents the measured conductivity from the eluate including the salt slug. For each chromatogram, the starting point, maximum, and end point, of each peak were calculated, in terms of column volumes passed through the analog. The peak starting point is the first point where the conductivity reached 5% of its maximum value. The peak end point is the last point where the conductivity is 5% of its maximum value. The peak maximum is the point where the conductivity reached its maximum value. The asymmetry factor at 5% peak height was also calculated for each chromatogram, according to Equation 1. The peak starting point, peak maximum, peak end point, and asymmetry factor for Examples 3-10 are summarized in Table 1.

TABLE 1

Figure 11A:
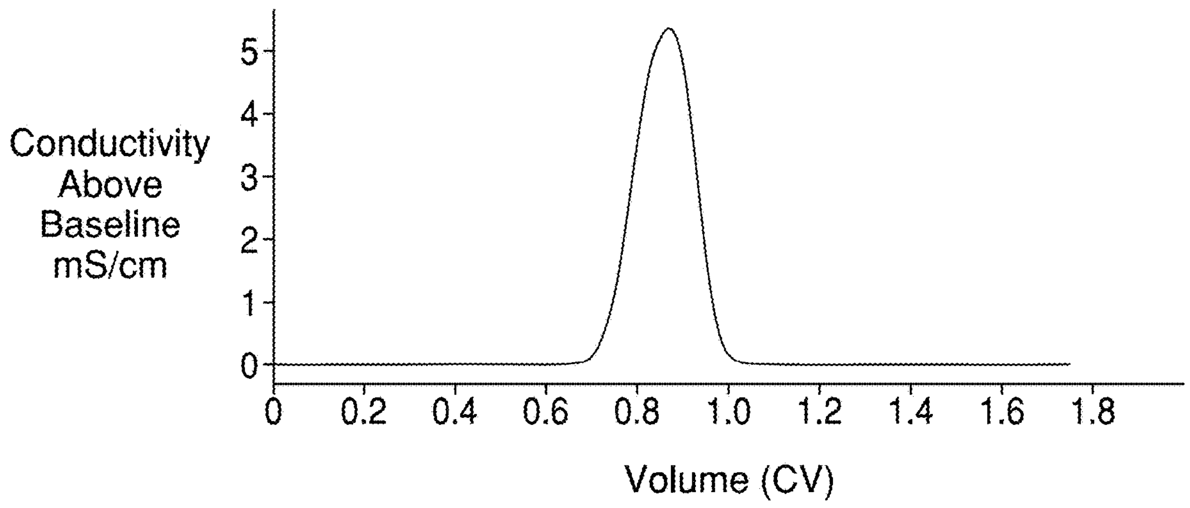
FIGS. 11A-11H are chromatograms generated from pre-use assessments of analogs, according to aspects of the present disclosure.
Figure 11B:
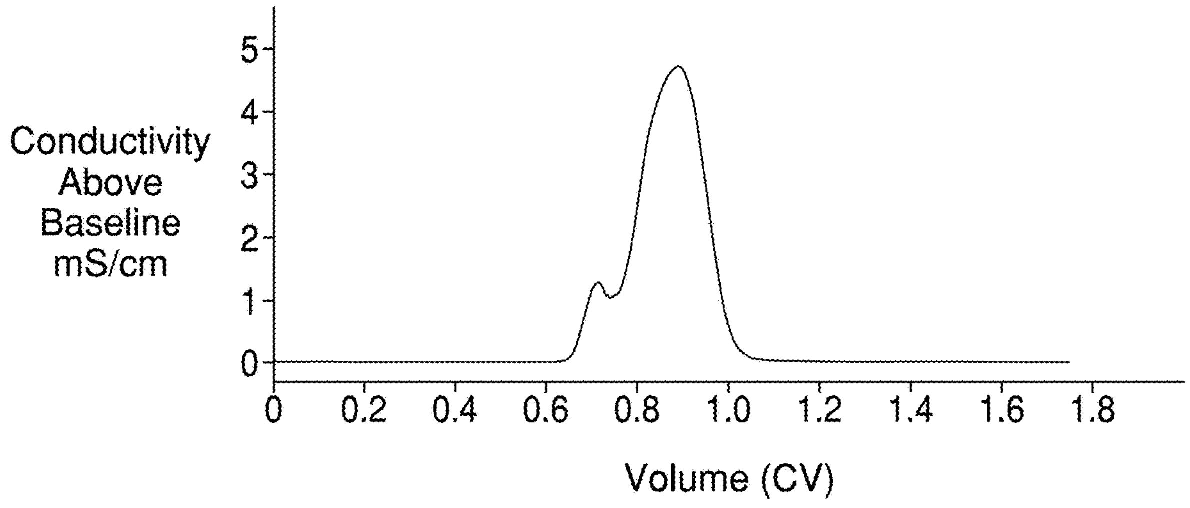
Figure 11C:
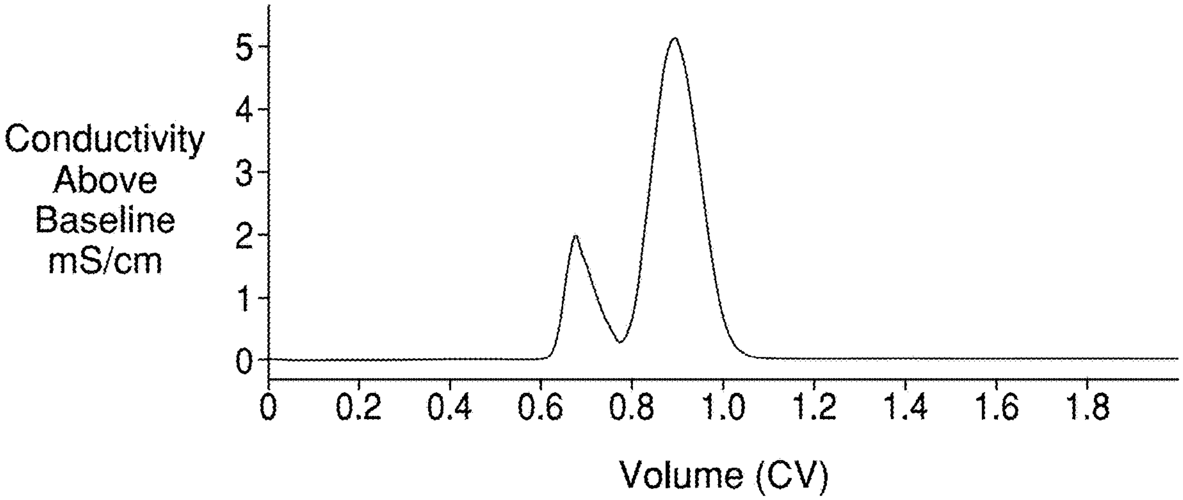
Figure 11D:
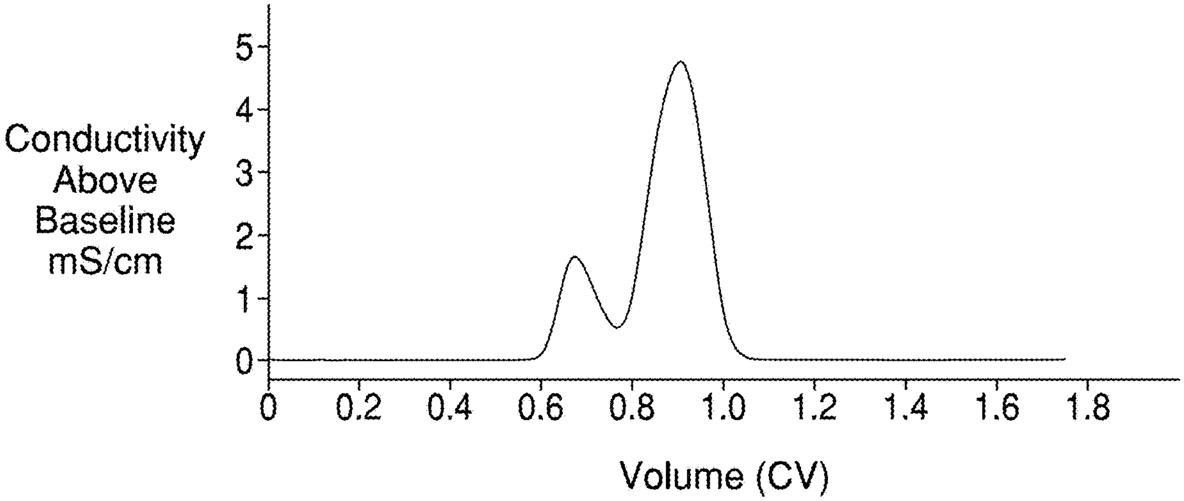
Figure 11E:
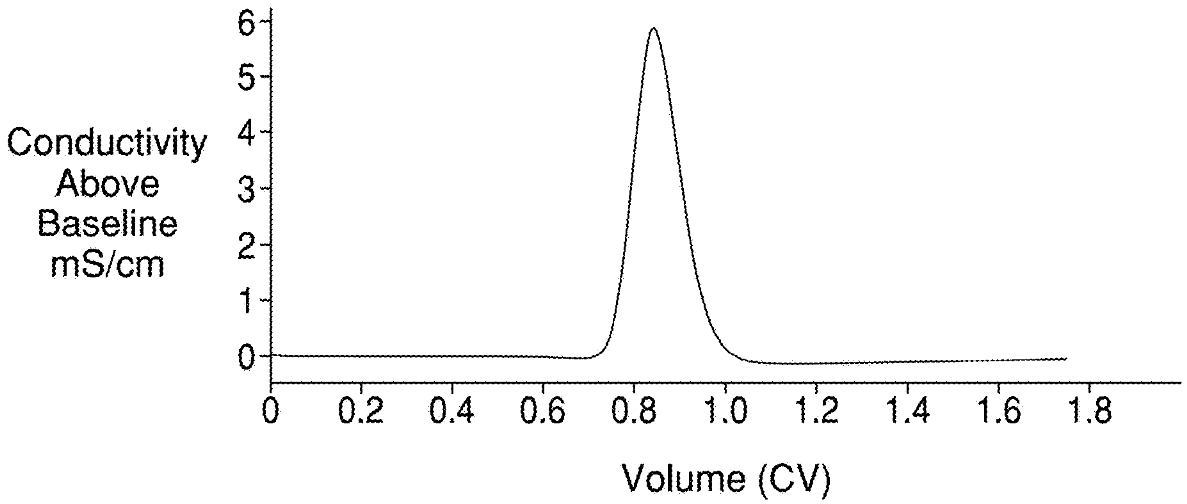
Figure 11F:
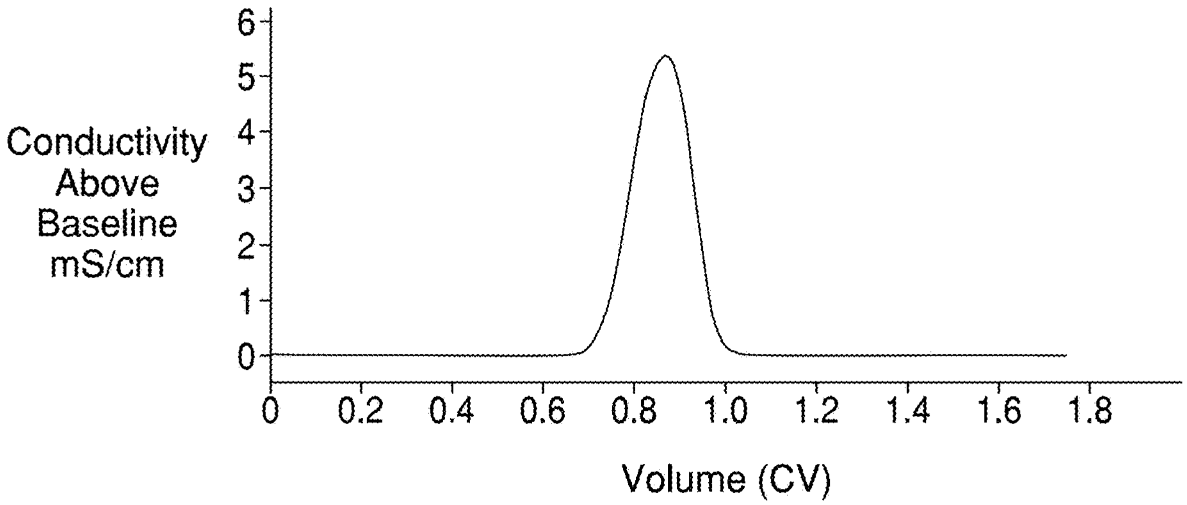
Figure 11G:
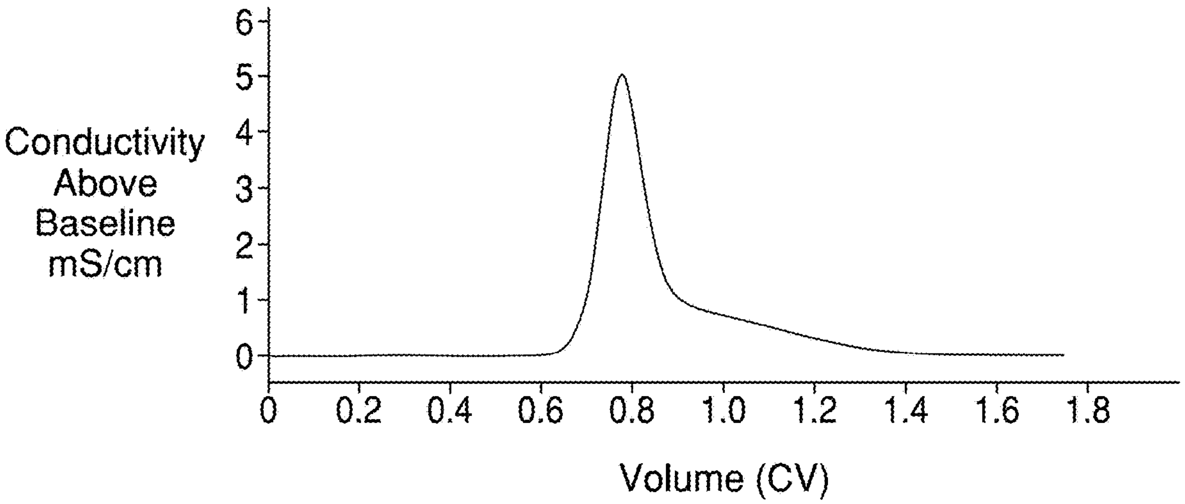
Figure 11H:
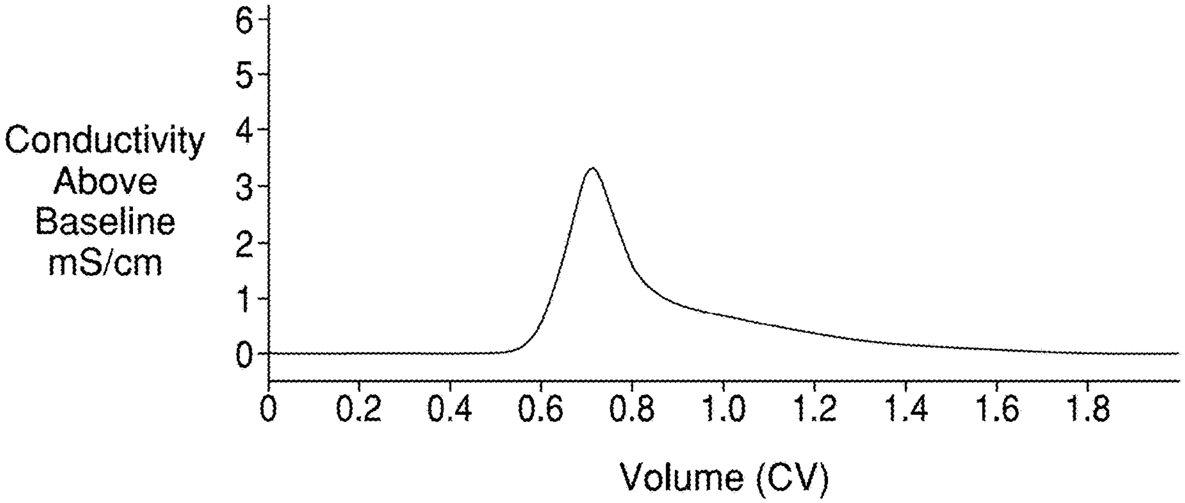

| | Deterioration Level | Media Disruption | Chromatogram | Peak Start (CV) | Peak Maximum (CV) | Peak End (CV) | Asymmetry Factor (a) |
|---|---|---|---|---|---|---|---|
| Example 3 | minor channeling | 2.0 cm void | FIG. 11A | 0.723 | 0.880 | 1.001 | 0.77 |
| Example 4 | moderate channeling | 3.0 cm void | FIG. 11B | 0.675 | 0.900 | 1.029 | 0.57 |
| Example 5 | severe channeling | 3.5 cm void | FIG. 11C | 0.642 | 0.799 | 1.032 | 0.50 |
| Example 6 | very severe channeling | 4.0 cm void | FIG. 11D | 0.624 | 0.915 | 1.052 | 0.47 |
| Example 7 | minor fouling | 3 discs | FIG. 11E | 0.751 | 0.853 | 1.005 | 1.50 |
| Example 8 | moderate fouling | 4 discs | FIG. 11F | 0.731 | 0.842 | 1.070 | 2.04 |
| Example 9 | severe fouling | 6 discs | FIG. 11G | 0.673 | 0.788 | 1.235 | 3.88 |
| Example 10 | very severe fouling | 8 discs | FIG. 11H | 0.579 | 0.723 | 1.379 | 4.57 |

The channeling analogs had fronted elution peaks with asymmetry factors less than 1. The fouling analogs had tailed elution peaks with asymmetry factors greater than 1.

Analogs for chromatographic columns with a loss of column integrity may be constructed and implemented as described herein. The analogs described herein may be used to develop or improve the efficiency of chromatography operations. For example, chromatography operations may be run with analogs including various loss of integrity conditions. The quality of biopharmaceutical products processed using the analogs may be analyzed, to investigate what effect the column integrity has on the quality of resulting biopharmaceutical products.

Product quality testing may include Pico microchip-capillary electrophoresis (PICO MCE) purity analysis, size-exclusion ultra performance liquid chromatography (SE-UPLC) purity analysis, imaged capillary isoelectric focusing (iCEIF), glycan analysis, host cell DNA analysis, and/or host cell protein analysis. PICO MCE purity analysis may include analysis of test articles by non-reduced and reduced microchip capillary electrophoresis using the GXII instrument to estimate purity and impurity levels (with an emphasis on the determination of the level of fragmentation) for product pool samples. SE-UPLC purity analysis includes size-exclusion chromatography and ultra performance liquid chromatography to separate protein species based on molecular weight. iCIEF includes imagining capillary isoelectric focusing method to determine relative abundances of charge variants of a biopharmaceutical product. Glycan analysis includes determining the fucosylated glycan content in the product using reverse-phase high performance liquid chromatography. Host cell DNA analysis includes the detection of DNA from the host cell (e.g., Chinese hamster ovary cells) in product samples using real-time quantitative polymerase chain reaction (PCR) analysis. Host cell protein analysis includes quantifying the presence of host cell proteins (HCP) in the product using an Enzyme Linked Immuno-Sorbent Assay (ELISA).

Based on the biopharmaceutical product quality testing, chromatography operations may be developed or improved. For example, models or relationships determined based on data from product quality testing can determine threshold levels of column integrity that may deleterious affect biopharmaceutical product quality. Pre-use assessment protocols may be developed with the determined threshold values to efficiently screen column integrity during biopharmaceutical product manufacturing.

The present disclosure is further described by the following non-limiting items.

Item 1. A chromatographic column analog comprising:

chromatography media; and one or more of:

- a void configured to create a zone of preferential flow within the chromatography media; or
- a block configured to create a zone of reduced flow within the chromatography media.

Item 2. The analog of item 1, wherein the analog includes the void and a tube comprising a top opening and a bottom opening, and the void is between the top opening and the bottom opening of the tube.

Item 3. The analog of item 2, wherein the void has a length of about 1.0 cm to about 10 cm, and the void has a width of about 0.5 cm to about 1.0 cm.

Item 4. The analog of item 2, further comprising a first filter screen in contact with the top opening and a second filter screen in contact with the bottom opening, wherein the first and second filter screens are impermeable to the chromatography media.

Item 5. The analog of item 2, wherein the tube includes a wall between the top opening and the bottom opening, and the wall is in contact with the chromatography media.

Item 6. The analog of item 2, wherein the tube comprises stainless steel, glass, or another material impermeable to water.

Item 7. The analog of item 1, wherein the analog includes the block, and the block includes a top face, a bottom face, and a thickness between the top face and the bottom face.

Item 8. The analog of item 7, wherein the bottom face has a width of about 0.5 cm to about 2.5 cm.

Item 9. The analog of item 1, wherein the analog has a total volume of about 15 mL to about 4600 mL.

Item 10. A chromatographic column analog comprising:

chromatography media; and one or more of:

- a void that does not include chromatography media, wherein the void is permeable to water; or
- a block that does not include chromatography media, wherein the block is impermeable to water.

Item 11. The analog of item 10, wherein the analog includes the void and a lumen comprising a top opening and a bottom opening, and the void is between the top opening and the bottom opening of the lumen.

Item 12. The analog of item 11, wherein the lumen is substantially parallel to a longitudinal axis of the analog.

Item 13. The analog of item 11, wherein a first portion of the chromatography media is above the top opening and a second portion of the chromatography media is below the bottom opening.

Item 14. The analog of item 11, wherein the analog includes the block and the block is below the top opening of the lumen and above the bottom opening of the lumen.

Item 15. The analog of item 10, wherein the analog includes the block, a width of the block is greater than or equal to a thickness of the block, and the thickness of the block is substantially parallel with a longitudinal axis of the analog.

Item 16. The analog of item 15, wherein the width of the block is about 50 percent to about 90 percent of an inner diameter of the analog.

Item 17. The analog of item 15, wherein the block is a first block and the analog further comprises a second block.

Item 18. A method of developing a pre-use assessment protocol, the method comprising: performing a first iteration of a chromatography operation using a chromatography column, thereby generating a first chromatogram and a first product pool;

- performing a second iteration of the chromatography operation using a channeling analog, thereby generating a second chromatogram and a second product pool;
- performing a third iteration of a chromatography operation using a blocking analog, thereby generating a third chromatogram and a third product pool;
- analyzing the product quality of the first product pool, the second product pool, and the third product pool;
- determining one or more peak characteristics of the first chromatogram, the second chromatogram, and the third chromatogram;
- determining a relationship between product quality and the one or more peak characteristics.

Item 19. The method of item 18, wherein analyzing the product quality includes Pico microchip-capillary electrophoresis (PICO MCE) purity analysis, size-exclusion ultra performance liquid chromatography (SE-UPLC) purity analysis, imaged capillary isoelectric focusing (iCEIF), glycan analysis, host cell DNA analysis, and/or host cell protein analysis.

Item 20. The method of item 18, wherein the chromatography operation includes introducing a mobile phase including a salt slug;

determining one or more peak characteristics of the first chromatogram, the second chromatogram, and the third chromatogram, includes:

determining a first peak start, a first peak maximum, and a first peak end for a first peak of the first chromatogram;

determining a second peak start, a second peak maximum, and a second peak end, for a second peak of the second chromatogram; and determining a third peak start, a third peak maximum, and a third peak end, for a third peak of the third chromatogram; and wherein the first peak, the second peak, and the third peak, correspond to elution of the salt slug.

Those skilled in the art will appreciate that the conception upon which this disclosure is based may readily be used as a basis for designing other methods and systems for carrying out the several purposes of the present disclosure. Accordingly, the claims are not to be considered as limited by the foregoing description.

What is claimed is:

1. A chromatographic column analog comprising:

chromatography media; and one or more voids, each void comprising a structure inserted into the chromatographic column analog and configured to create a zone of preferential flow within the chromatography media to simulate channeling, wherein each void is free of the chromatographic media and is elongated and cylindrical having a top opening and a bottom opening; and optionally comprising one or more blocks, each block comprising a structure inserted into the chromatographic column analog and configured to create a zone of reduced flow within the chromatography media to simulate fouling.

2. The analog of claim 1, wherein the analog includes for each void a respective tube comprising a top opening and a bottom opening, and each void is between the top opening and the bottom opening of the respective tube.

3. The analog of claim 2, wherein each void has a length of about 1.0 cm to about 10 cm, and each void has a width of about 0.5 cm to about 1.0 cm.

4. The analog of claim 2, each tube further comprising a first filter screen in contact with the top opening of the tube and a second filter screen in contact with the bottom opening of the tube, wherein the first and second filter screens are impermeable to the chromatography media.

5. The analog of claim 2, wherein each tube includes a wall between the top opening and the bottom opening of the tube, and the wall is in contact with the chromatography media.

6. The analog of claim 2, wherein each tube comprises stainless steel, or glass.

7. The analog of claim 1, wherein the analog includes one or more blocks, and each block includes a top face, a bottom face, and a thickness between the top face and the bottom face.

8. The analog of claim 7, wherein each bottom face has a width of about 0.5 cm to about 2.5 cm.

9. The analog of claim 1, wherein the analog has a total volume of about 15 mL to about 4600 mL.

10. A chromatographic column analog comprising:

chromatography media; and one or more voids, of:

wherein each void does not include chromatography media and comprises a structure inserted into the chromatographic column analog, wherein the void is permeable to water and is configured to simulate channeling, wherein each void is elongated and cylindrical having a top opening and a bottom opening; and optionally comprising one or more blocks, wherein each block does not include chromatography media and comprises a structure inserted into the chromatographic column analog, wherein each block is impermeable to water and is configured to simulate fouling.

11. The analog of claim 10, wherein the analog includes a lumen comprising a top opening and a bottom opening, and each void is between the top opening and the bottom opening of the lumen.

12. The analog of claim 11, wherein the lumen is substantially parallel to a longitudinal axis of the analog.

13. The analog of claim 11, wherein a first portion of the chromatography media is above the top opening of the lumen and a second portion of the chromatography media is below the bottom opening of the lumen.

14. The analog of claim 11, wherein the analog includes one or more blocks and each block is below the top opening of the lumen and above the bottom opening of the lumen.

15. The analog of claim 10, wherein the analog includes, one or more blocks and a width of each block is greater than or equal to a thickness of each block, and the thickness of each block is substantially parallel with a longitudinal axis of the analog.

16. The analog of claim 15, wherein the width of each block is about 50 percent to about 90 percent of an inner diameter of the analog.

17. The analog of claim 15, wherein the one or more blocks comprise a first block and the analog further comprises a second block.

* * * * *